(12) United States Patent
Goto et al.

(10) Patent No.: US 7,889,395 B2
(45) Date of Patent: Feb. 15, 2011

(54) IMAGE PROCESSING APPARATUS, IMAGE PROCESSING METHOD, AND PROGRAM

(75) Inventors: Fumihiro Goto, Kawasaki (JP);
Fumitaka Goto, Tokyo (JP); Masao Kato, Kawasaki (JP); Akitoshi Yamada, Yokohama (JP); Tetsuya Suwa, Yokohama (JP); Mitsuhiro Ono, Tokyo (JP); Arata Miyagi, Kawasaki (JP); Yusuke Hashii, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 787 days.

(21) Appl. No.: 11/771,458

(22) Filed: Jun. 29, 2007

(65) Prior Publication Data
US 2008/0123151 A1    May 29, 2008

(30) Foreign Application Priority Data
Jul. 4, 2006    (JP) .............................. 2006-184845

(51) Int. Cl.
*G06T 5/00*    (2006.01)
(52) U.S. Cl. .................. 358/3.27; 358/1.9; 358/3.24; 358/3.26; 358/532; 382/254; 382/257; 382/266; 382/269
(58) Field of Classification Search ....... 358/3.26–3.27; 382/254–266
See application file for complete search history.

(56) References Cited

U.S. PATENT DOCUMENTS

| | | | |
|---|---|---|---|
| 5,257,182 A * | 10/1993 | Luck et al. ................. | 382/224 |
| 5,321,769 A * | 6/1994 | Takahashi et al. ........... | 382/174 |
| 5,668,888 A * | 9/1997 | Doi et al. .................... | 382/132 |
| 6,088,130 A * | 7/2000 | Matsukubo ................. | 358/447 |
| 6,600,832 B1 * | 7/2003 | Nakayama et al. .......... | 382/162 |
| 6,606,421 B1 * | 8/2003 | Shaked et al. ............... | 382/275 |
| 6,717,698 B1 * | 4/2004 | Lee ............................. | 358/1.9 |
| 6,735,341 B1 * | 5/2004 | Horie et al. ................. | 382/239 |
| 6,847,738 B1 * | 1/2005 | Scognamiglio et al. ..... | 382/260 |

(Continued)

FOREIGN PATENT DOCUMENTS

JP      3099354 B      4/1991

(Continued)

OTHER PUBLICATIONS

Raghu Krishnapuram et al. "Morphological Methods for Detection and Classification of Edges in Range Images", 1992, Journal of Mathematical Imaging and Vision 2, 351-375, Kluwer Academic Publishers.*

*Primary Examiner*—King Y Poon
*Assistant Examiner*—Richard Zhu
(74) *Attorney, Agent, or Firm*—Fitzpatrick, Cella, Harper & Scinto

(57) ABSTRACT

In order to provide an edge emphasis technique that can eliminate image deterioration of a digital image, an image processing apparatus includes a region setting unit which sets a region including a pixel of interest, a brightness value derivation unit which derives brightness values of the pixels, a first derivative derivation unit which derives first derivatives of the brightness values derived by the brightness value derivation unit, an edge direction determination unit which determines an edge direction of brightness at a position of the pixel of interest based on the results of the first derivatives, a range determination unit which determines a range, and a replacement unit which replaces the pixel value of the pixel of interest.

6 Claims, 20 Drawing Sheets

U.S. PATENT DOCUMENTS

| | | | |
|---|---|---|---|
| 6,850,341 B1 * | 2/2005 | Ito | 358/1.9 |
| 7,020,314 B1 * | 3/2006 | Suri et al. | 382/130 |
| 7,020,332 B2 * | 3/2006 | Nenonen et al. | 382/169 |
| 7,231,072 B2 * | 6/2007 | Yamano et al. | 382/128 |
| 7,508,541 B2 * | 3/2009 | Ishiguro | 358/1.9 |
| 7,522,314 B2 * | 4/2009 | Atkins | 358/3.27 |
| 2004/0196408 A1 * | 10/2004 | Ishikawa et al. | 348/616 |
| 2008/0002998 A1 | 1/2008 | Goto et al. | 399/39 |

FOREIGN PATENT DOCUMENTS

| | | |
|---|---|---|
| JP | 2620368 B | 6/1997 |
| JP | 2002-77623 A | 3/2002 |
| JP | 3472094 B | 12/2003 |

* cited by examiner

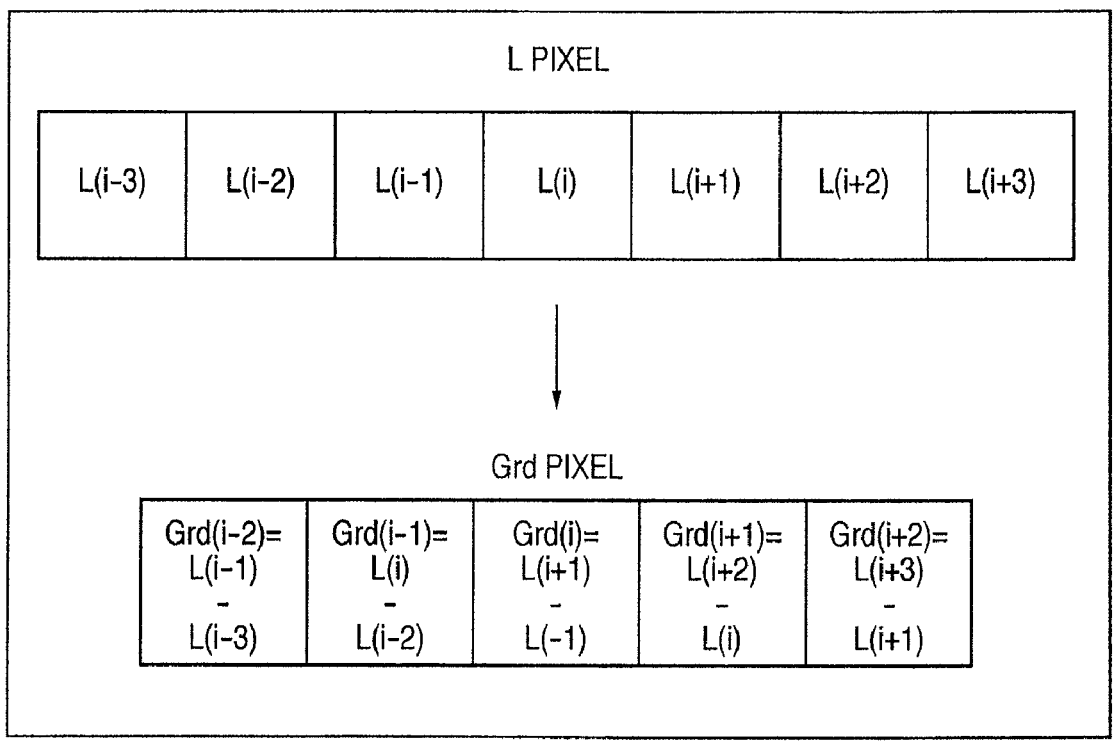
F I G. 10

FIG. 19

| Lap SIGN OF PIXEL OF INTEREST | + | − | 0 | 0 | 0 |
|---|---|---|---|---|---|
| TOTAL Lap SIGN OF PREVIOUS AND NEXT PIXELS | | | + | − | 0 |
| REPLACEMENT PIXEL POSITION | MINIMUM L | MAXIMUM L | MINIMUM L | MAXIMUM L | MAXIMUM L |

IMAGE PROCESSING APPARATUS, IMAGE PROCESSING METHOD, AND PROGRAM

BACKGROUND OF THE INVENTION

1. Field of the Invention

The present invention relates to an image processing technique and, more particularly, to an edge emphasis technique of a digital image.

2. Description of the Related Art

A copying machine which optically scans a document image and prints a scanned image on a print medium such as a paper sheet or the like is known. In general, the edge of an image optically scanned by a scanning unit (scanner) of a copying machine is smoother than that of a document image. For this reason, an image with poor sharpness is output when the scanned image is printed on a print medium intact. Hence, a technique for applying edge emphasis processing to image data obtained after scanning a document image is known. However, in general, upon applying the edge emphasis processing, moiré is emphasized together. To prevent this problem, the following technique is known. That is, this technique uses image region separation which separates scanned image data into two regions, that is, a text region and a halftone region, and applies edge emphasis processing to the text region and smoothing processing to the halftone region to attain enhancement of sharpness and a reduction of moiré at the same time. However, if a determination error occurs in image region separation, the smoothing processing may be applied to a text region, and the edge emphasis may be applied to a halftone region, thus deteriorating an image. Depending on the precision of image region separation, for example, a part of a character may be determined to be a text region, and the remaining part of the character may be determined to be a halftone region. In this case, switching of the edge emphasis and smoothing processes occurs in one character. Such switching considerably impairs an image.

Japanese Patent No. 3099354 (reference 1) discloses a technique that continuously sets an edge emphasis level according to an edge amount. With this technique, adaptive edge emphasis according to the edge amount can be applied and can eliminate image deterioration. Japanese Patent Laid-Open No. 2002-77623 (reference 2) discloses a technique that adaptively sets an edge emphasis level according to an edge amount, and disables the adaptive setting for a halftone region. With this technique, adaptive edge emphasis according to the edge amount can be applied, and edge emphasis of the halftone region can be reduced. Furthermore, Japanese Patent No. 3472094 (reference 3) discloses a technique that separates an image into multiple regions including a text region, photo region, and halftone region according to the degree of coupling and density difference of black pixels. With this technique, more flexible image region separation can be implemented.

In general, upon applying the edge emphasis processing, overshoot and undershoot occur at an edge part. FIG. 14 illustrates the edge emphasis processing result using an unsharp mask that adjusts an emphasis level according to an edge amount. Referring to FIG. 14, white dots 1401 represent brightness levels of an original image at respective pixel positions, and black dots 1402 represent brightness levels at the respective pixel positions, which are converted by:

$$S'=S+K*(S-U) \quad (1)$$

where S is an image signal of a pixel of interest, U is a weighted average value of the image signal around the pixel of interest, and K is a value generated based on the type and edge amount of an image which is separated by image region separation. In FIG. 14, two pixels each before and after the pixel of interest are used as reference pixels, and equation (1) is applied for the sake of descriptive convenience. As shown in FIG. 14, overshoot and undershoot occur in the edge shape after the edge emphasis. When this processing result is output using a high-resolution, multi-gradation output apparatus, even overshoot and undershoot are accurately expressed, and an image is output with a bordered edge part.

Since a conventional output apparatus has a low print resolution, overshoot and undershoot of the edge part are inconspicuous, and a satisfactory output image is obtained. However, upon advent of high-resolution, multi-gradation output apparatuses in recent years, overshoot and undershoot of the edge part are recognized as bordering of the edge part, thus leading to image deterioration.

Hence, Japanese Patent No. 2620368 (reference 4) discloses an edge processing technique that replaces the pixel of interest by neighbor pixels. More specifically, it is checked if the pixel of interest is convex upward or downward, or has any other shape in the distribution pattern of an image signal. Based on the checking result, the following processes are done: if the pixel of interest is convex upward, the pixel of interest is replaced by a maximum value in a neighbor region; if the pixel of interest is convex downward, the pixel of interest is replaced by a minimum value in the neighbor region; otherwise, the pixel of interest is replaced by the average value or the value of the pixel of interest.

However, in the technique disclosed in reference 1, an edge emphasis level is set focusing on the fluctuation amount of an edge (edge amount). For this reason, a large edge emphasis level is set for a halftone region having the same fluctuation amount as a text region, and moiré is also emphasized, thus deteriorating an image.

In the technique disclosed in reference 2, an edge emphasis level is similarly set focusing on an edge amount. However, since this technique also focuses on a halftone cycle (fluctuation count), and disables the adaptive edge emphasis level setting based on the halftone cycle (fluctuation count), edge emphasis on a halftone region can be stopped, thus reducing moiré emphasis. However, although the edge emphasis level is adaptively set up to a certain fluctuation count in accordance with the edge amount, when the certain fluctuation count is reached, the edge emphasis level setting is disabled irrespective of the edge amount. For this reason, switching of the processes occurs at the certain fluctuation count, thus deteriorating an image.

The technique disclosed in reference 3 focuses on a fluctuation count, since the edge amount of an image signal decreases with increasing degree of coupling of black pixels. Also, this technique focuses on the edge amount since the density difference of black pixels is the edge amount of an image signal. Three or more values are set for both the fluctuation count and edge amount to improve separation precision upon separating an image region into multiple regions including at least a text region, photo region, and halftone region by image region separation. However, adaptive separation according to the fluctuation count and edge amount, and adaptive processing intensities are not applied, and adaptive processes cannot be made according to the fluctuation count or edge amount. Hence, switching of the processes occurs, deteriorating an image and thus posing a problem.

In the technique disclosed in reference 4, the edge emphasis effect can be obtained by setting a region other than an upward or downward convex region. However, since the same processing is also applied to a halftone region, the aforementioned moiré emphasis is done together, thus posing a problem.

SUMMARY OF THE INVENTION

The present invention has been made in consideration of the aforementioned problems, and has as its object to solve at least one of the aforementioned problems.

According to one aspect of the present invention, an image processing apparatus for processing image data, comprising: a region setting unit adapted to set a region configured by a plurality of pixels including a pixel of interest; a brightness value derivation unit adapted to derive brightness values of the pixels in the region; a first derivative derivation unit adapted to derive first derivatives of the brightness values derived by the brightness value derivation unit for a plurality of pixel sequences in different directions, which include the pixel of interest; an edge direction determination unit adapted to determine an edge direction of brightness at a position of the pixel of interest based on the results of the first derivatives at positions of the pixel of interest in the respective pixel sequences derived by the first derivative derivation unit; a range determination unit adapted to determine a pixel sequence range, which is to undergo pixel value replacement, based on the first derivatives at respective positions of a plurality of pixels which line up in the edge direction determined by the edge direction determination unit; and a replacement unit adapted to calculate second derivatives of brightness values along a lineup direction of the pixels in the pixel sequence range, to replace a pixel value of the pixel of interest by a pixel value of a pixel which has a minimum brightness value in the pixel sequence range when the second derivative at the position of the pixel of interest assumes a positive value, and to replace a pixel value of the pixel of interest by a pixel value of a pixel which has a maximum brightness value in the pixel sequence range when the second derivative at the position of the pixel of interest assumes a negative value.

According to another aspect of the present invention, an image processing apparatus for processing image data, comprising: an image type acceptance unit adapted to accept a type of image data from a user; a brightness value derivation unit adapted to derive brightness values of pixels in the image data; a range determination unit adapted to determine a pixel sequence range, which is to undergo pixel value replacement, based on the type; and a replacement unit adapted to calculate second derivatives of brightness values along a lineup direction of the pixels in the pixel sequence range, to replace a pixel value of the pixel of interest by a pixel value of a pixel which has a minimum brightness value in the pixel sequence range when the second derivative at the position of the pixel of interest assumes a positive value, and to replace a pixel value of the pixel of interest by a pixel value of a pixel which has a maximum brightness value in the pixel sequence range when the second derivative at the position of the pixel of interest assumes a negative value.

According to still another aspect of the present invention, an image processing method for processing image data, comprising: a region setting step of setting a region configured by a plurality of pixels including a pixel of interest; a brightness value derivation step of deriving brightness values of the pixels in the region; a first derivative derivation step of deriving first derivatives of the brightness values derived in the brightness value derivation step for a plurality of pixel sequences in different directions, which include the pixel of interest; an edge direction determination step of determining an edge direction of brightness at a position of the pixel of interest based on the results of the first derivatives at positions of the pixel of interest in the respective pixel sequences derived in the first derivative derivation step; a range determination step of determining a pixel sequence range, which is to undergo pixel value replacement, based on the first derivatives at respective positions of a plurality of pixels which line up in the edge direction determined in the edge direction determination step; and a replacement step of calculating second derivatives of brightness values along a lineup direction of the pixels in the pixel sequence range, replacing a pixel value of the pixel of interest by a pixel value of a pixel which has a minimum brightness value in the pixel sequence range when the second derivative at the position of the pixel of interest assumes a positive value, and replacing a pixel value of the pixel of interest by a pixel value of a pixel which has a maximum brightness value in the pixel sequence range when the second derivative at the position of the pixel of interest assumes a negative value.

According to yet another aspect of the present invention, an image processing program stored in a computer-readable storage medium, comprising: a program code for implementing a region setting step of setting a region configured by a plurality of pixels including a pixel of interest; a program code for implementing a brightness value derivation step of deriving brightness values of the pixels in the region; a program code for implementing a first derivative derivation step of deriving first derivatives of the brightness values derived in the brightness value derivation step for a plurality of pixel sequences in different directions, which include the pixel of interest; a program code for implementing an edge direction determination step of determining an edge direction of brightness at a position of the pixel of interest based on the results of the first derivatives at positions of the pixel of interest in the respective pixel sequences derived in the first derivative derivation step; a program code for implementing a range determination step of determining a pixel sequence range, which is to undergo pixel value replacement, based on the first derivatives at respective positions of a plurality of pixels which line up in the edge direction determined in the edge direction determination step; and a program code for implementing a replacement step of calculating second derivatives of brightness values along a lineup direction of the pixels in the pixel sequence range, replacing a pixel value of the pixel of interest by a pixel value of a pixel which has a minimum brightness value in the pixel sequence range when the second derivative at the position of the pixel of interest assumes a positive value, and replacing a pixel value of the pixel of interest by a pixel value of a pixel which has a maximum brightness value in the pixel sequence range when the second derivative at the position of the pixel of interest assumes a negative value.

According to still yet another aspect of the present invention, an image processing apparatus for processing image data, comprising: an attribute determination unit adapted to determine an attribute of an image in association with a pixel of interest; a region setting unit adapted to set a region configured by a plurality of pixels, which include the pixel of interest, and the number of which is set according to the determination result of the attribute determination unit; and a modification unit adapted to modify the pixel of interest using the pixels in the region set by the region setting unit.

According to yet still another aspect of the present invention, an image processing method for processing image data, comprising: an attribute determination step of determining an attribute of an image in association with a pixel of interest; a region setting step of setting a region configured by a plurality of pixels, which include the pixel of interest, and the number of which is set according to the determination result in the attribute determination step; and a modification step of modify the pixel of interest using the pixels in the region set in the region setting step.

According to still yet another aspect of the present invention, an image processing program stored in a computer-readable storage medium, comprising: a program code for implementing an attribute determination step of determining an attribute of an image in association with a pixel of interest; a program code for a region setting step of setting a region configured by a plurality of pixels, which include the pixel of interest, and the number of which is set according to the determination result in the attribute determination step; and a program code for a modification step of modifying the pixel of interest using the pixels in the region set in the region setting step.

According to the present invention, an edge emphasis technique that can eliminate image deterioration of a digital image can be provided.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 is a view for explaining derivation of a first derivative (Grd);

FIG. 19 is a table for explaining a determination method of a replacement pixel position.

DETAILED DESCRIPTION OF THE PREFERRED EMBODIMENTS

Preferred exemplary embodiments of the present invention will be described in detail hereinafter with reference to the accompanying drawings. Note that building components described in these embodiments are merely examples, and they do not limit the scope of the invention.

First Embodiment

As the first embodiment of an image processing apparatus according to the present invention, an MFP (Multi Function Printer) will be exemplified below. In the following description, the apparatus arrangement and schematic operation of the MFP as a precondition will be explained first, and characteristic features of the present invention will then be explained in detail.

<Arrangement of MFP>

Figure 1:
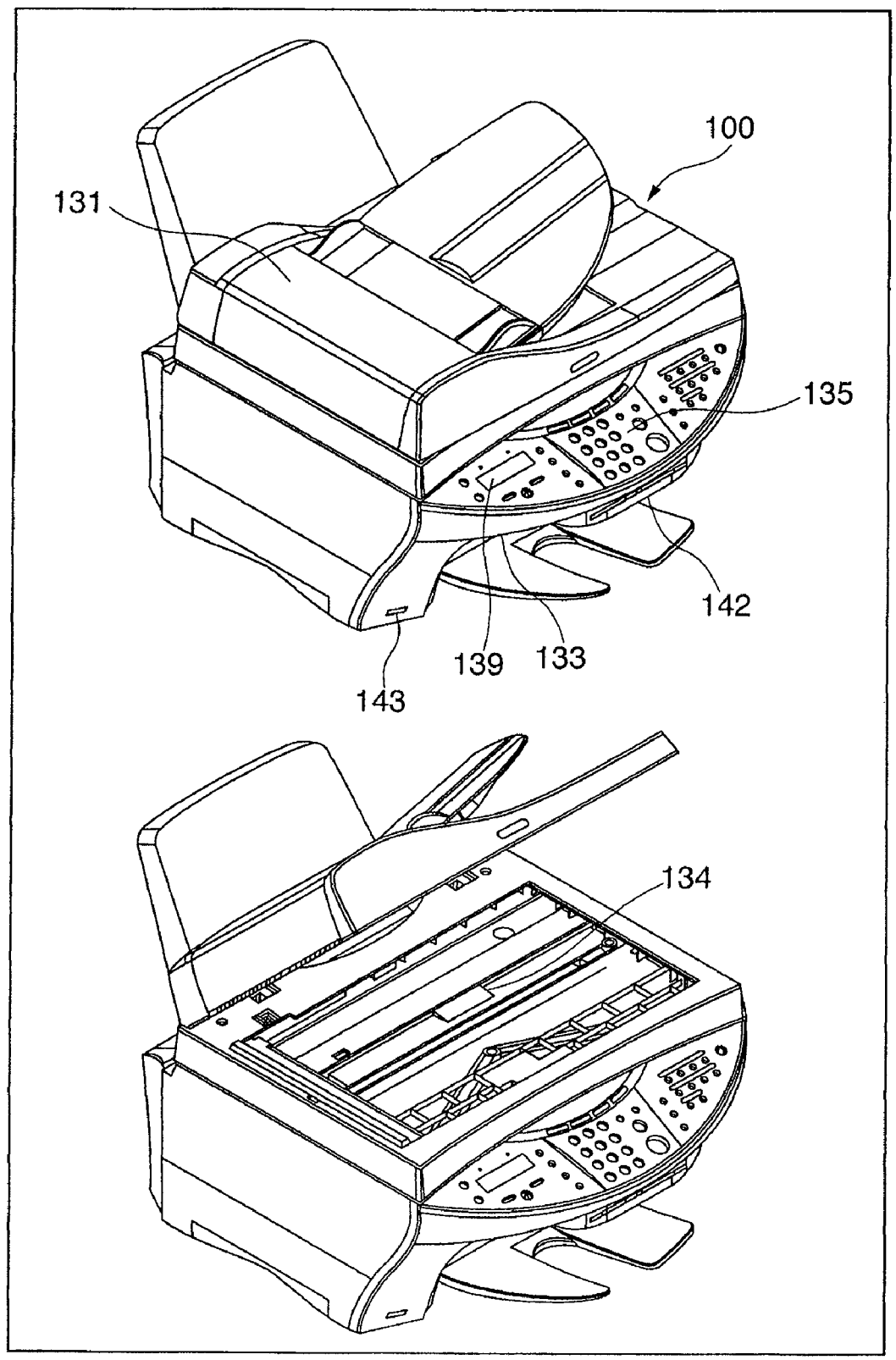
FIG. 1 shows schematic perspective views of a multi function printer (MFP) according to the first embodiment.

FIG. 1 shows schematic perspective views of a multi function printer (to be referred to as an MFP hereinafter) according to the first embodiment.

An MFP 100 comprises a function of printing data received from a host computer (PC) as a normal PC printer, and a function of scanning a document image as a scanner. Furthermore, functions as the MFP alone include a copy function of printing an image scanned by the scanner using the printer, a function of printing image data directly read from a storage medium such as a memory card or the like. Or the functions include a function of printing image data received from a digital camera or the like.

To implement these functions, the MFP 100 comprises a scanning device 134 such as a flatbed scanner or the like, and a printing device 133 of an ink-jet system, electrophotography system, or the like. Also, the MFP 100 comprises a display panel 139 used to notify the user of various states, and an operation panel 135 including various key switches, and the like, which are used to accept various instructions from the user. The MFP 100 comprises a USB port (not shown) used to communicate with the PC on its back surface, and the USB port allows the MFP 100 to make various communications with the PC. In addition to the above arrangement, the MFP 100 comprises a card slot 142 used to read out data from various memory cards, and a camera port 143 used to make direct communications with a digital still camera (DSC). In addition, the MFP 100 comprises an auto document feeder (to be abbreviated as ADF hereinafter) 131 used to automatically set a document on a document table.

Figure 2:
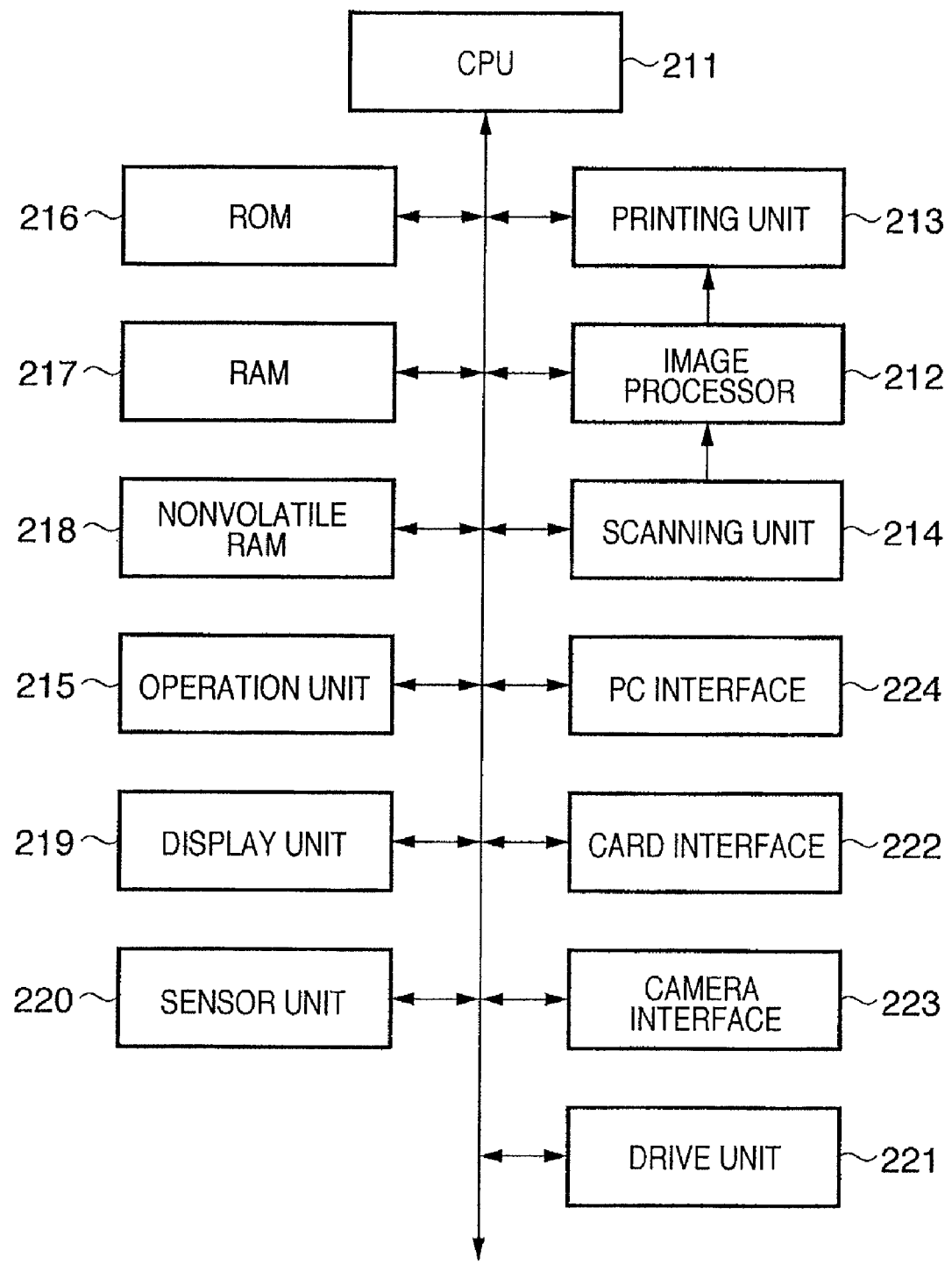
FIG. 2 is a block diagram showing the internal arrangement of the MFP.

FIG. 2 is a block diagram showing the internal arrangement of the MFP 100.

A CPU 211 controls various functions of the MFP 100 by executing various image processing programs stored in a ROM 216 in accordance with operations accepted from the user at an operation unit 215.

A scanning unit 214 corresponds to the scanning device 134, scans a document image using an optical sensor such as a CCD or the like, and outputs analog brightness data of, for example, red (R), green (G), and blue (B). The scanning unit 214 may comprise a contact image sensor (CIS) in place of the CCD. Using the aforementioned ADF 131, the scanning unit 214 can successively scan order sheets and the like.

A card interface 222 corresponds to the card slot 142, and reads image data, which is captured by, for example, a DSC and is stored in a memory card or the like, in accordance with an operation by the user at the operation unit 215. Note that the color space of image data read via the card interface 222 is converted from that (e.g., YCbCr) of the DSC into a standard RGB color space (e.g., NTSC-RGB or sRGB) if necessary. The read image data undergoes processes such as resolution conversion into the effective number of pixels and the like based on its header information as needed. A camera interface 223 corresponds to the camera port 143, and reads image data by directly connecting a DSC.

An image processor 212 is a functional unit for applying image processes to be described later to image data. For example, the image processor 212 executes image processes such as image analysis, calculations of conversion characteristics, conversion from brightness signals (RGB) into density signals (CMYK), scaling, gamma conversion, error diffusion, and the like. The image data that has undergone these image processes is stored in a RAM 217. When data stored in the RAM 217 reaches a predetermined data size required to be printed by a printing unit 213 corresponding to the printing device 133, the printing unit 213 executes a print operation.

A nonvolatile RAM 218 comprises, for example, a battery backed-up SRAM or the like, and stores data unique to the image processing apparatus or the like.

The operation unit 215 corresponds to the operation panel 135, and is a functional unit that accepts various operations from the user. For example, the operation unit 215 comprises keys specialized to attain specific processes such as a photo direct print start key which allows the user to select image data stored in a storage medium (memory card) and to start printing, a key used to print an order sheet, a key used to scan an order sheet, and the like. The operation unit 215 also comprises a copy start key in a monochrome copy mode or color copy mode, a mode key used to designate a mode such as a copy resolution, image quality, and the like, a stop key used to stop a copy operation or the like. Furthermore, the operation unit 215 comprises a numerical keypad used to input a copy count, a registration key, and the like. The CPU 211 detects the pressing states of these keys and controls respective units according to the detected states.

A display unit 219 corresponds to the display panel 139, comprises a dot matrix type liquid crystal display unit (LCD) and an LCD driver, and makes various displays under the control of the CPU 211. Also, the display unit 219 may display thumbnails of image data recorded on a storage medium.

The printing unit 213 corresponds to the printing device 133, and comprises an ink-jet head of an ink-jet system, general-purpose IC, and the like. The printing unit 213 reads out image data stored in the RAM 217 and prints it out as a hard copy under the control of the CPU 211.

A drive unit 221 includes stepping motors for driving feed and discharge rollers, gears for transmitting the driving forces of the stepping motors, a driver circuit for controlling the stepping motors, and the like in the operations of the scanning unit 214 and printing unit 213.

A sensor unit 220 includes a print sheet width sensor, print sheet sensor, document width sensor, document sensor, print medium sensor, and the like. The CPU 211 detects the states of a document and print sheet based on information obtained from this sensor unit 220.

A PC interface 224 is an interface between the PC and MFP 100. The MFP 100 can accept a print operation, scan operation, and the like from the PC via the PC interface 224.

In a copy operation by the MFP 100 alone, the image processor 212 processes image data, which is scanned by the scanning unit 214 based on the user's operation at the operation unit 215, and the printing unit 213 prints the processed image data.

<Overview of Image Processes>

Figure 3:
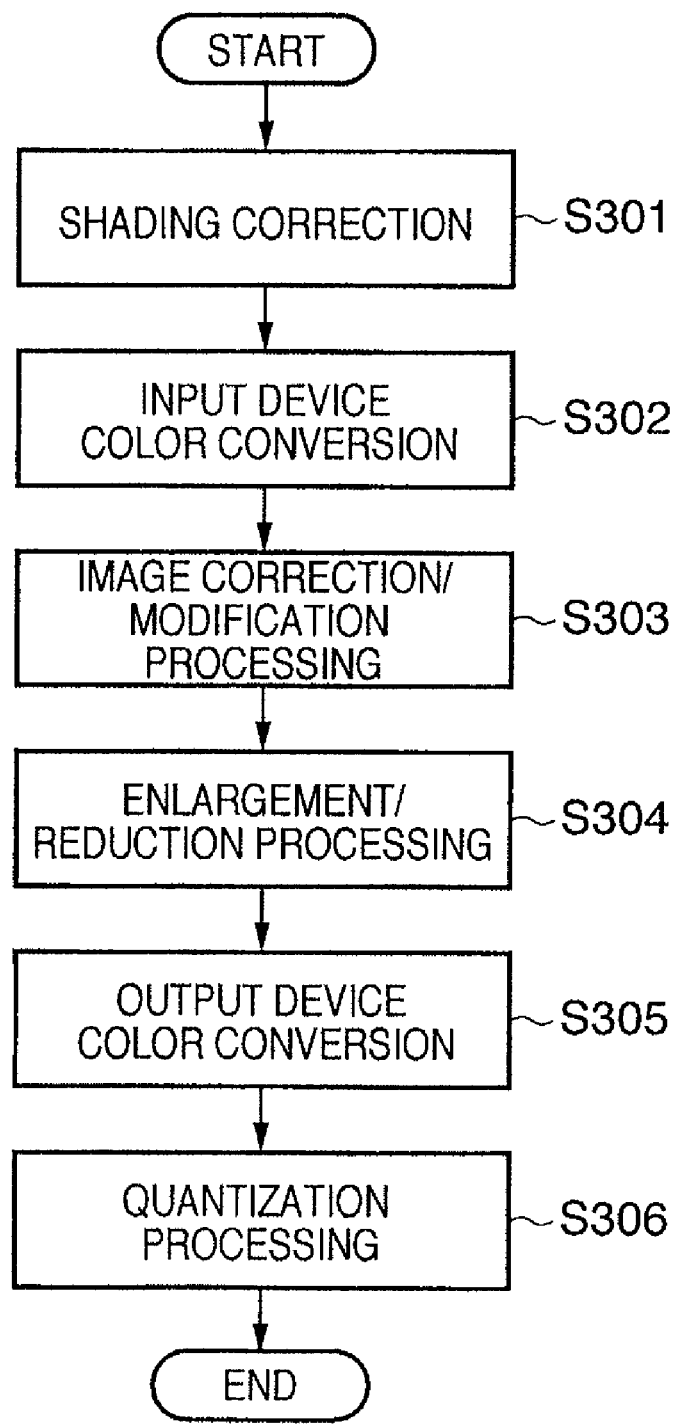
FIG. 3 is a flowchart of the overall processing to be executed by an image processor of the MFP.

FIG. 3 is a flowchart of the processes executed by the image processor of the MFP. Respective steps will be described below, but a detailed description of the processes will not be given. Note that the following steps are implemented when the CPU 211 executes various control programs.

In step S301, the CPU 211 executes shading correction. That is, the CPU 211 applies processing for correcting variations of an image sensing element to image data, which is scanned by the scanning unit 214 and is A/D-converted.

In step S302, the CPU 211 executes input device color conversion. This processing converts image data expressed by an input device-dependent color space into a standard color space. The standard color space includes sRGB standardized by IEC (International Electrotechnical Commission), AdobeRGB propounded by Adobe Systems, and the like. The conversion method includes an arithmetic method using a 3×3 or 3×9 matrix, a lookup table method which determines values based on a table that describes conversion rules, and the like.

In step S303, the CPU 211 executes image correction/modification processing. More specifically, the image correction/modification processing includes edge emphasis processing that corrects blurring as a result of scanning, text modification processing that improves legibility of text, processing for removing bleed-through that has occurred due to scanning upon light irradiation, and the like. Note that details of the edge emphasis processing will be described later.

In step S304, the CPU 211 executes enlargement/reduction processing. This processing converts image data to a desired scale when the user designates a zoom scale, a 2-in-1 copy mode that lays out two document images on one sheet, or the like. As the conversion method, methods such as bicubic, nearest neighbor, and the like are generally used.

In step S305, the CPU 211 executes output device color conversion. This processing converts image data expressed by the standard color space into that data expressed by an output device-dependent color space. For example, when the printing unit 213 of the MFP 100 of this embodiment adopts an ink-jet system that uses inks of cyan (C), magenta (M), yellow (Y), black (K), and the like, RGB data is converted into CMYK data. This conversion processing is the same as that in step S302.

In step S306, the CPU 211 executes quantization processing of image data. That is, the CPU 211 converts image data into tone levels that can be printed by the printing unit 213. For example, in the case of binary expression, that is, ON/OFF of ink dots in the ink-jet printing unit, image data may be binarized by a quantization method such as error diffusion or the like. As a result, the quantization processing can convert image data into a data format that the printing unit 213 can process, and the printing unit 213 executes a print operation based on this image data.

<Image Processing Unit>

Figure 4:
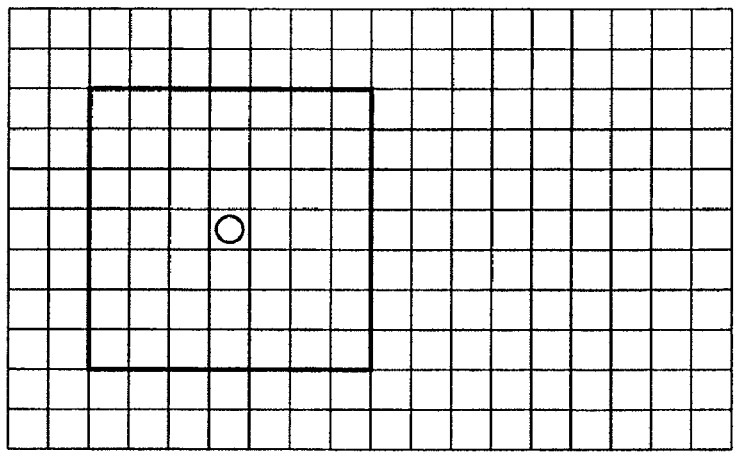
FIG. 4 is a view for explaining a processing unit of image processes upon execution of the image processes.
Figure 4:
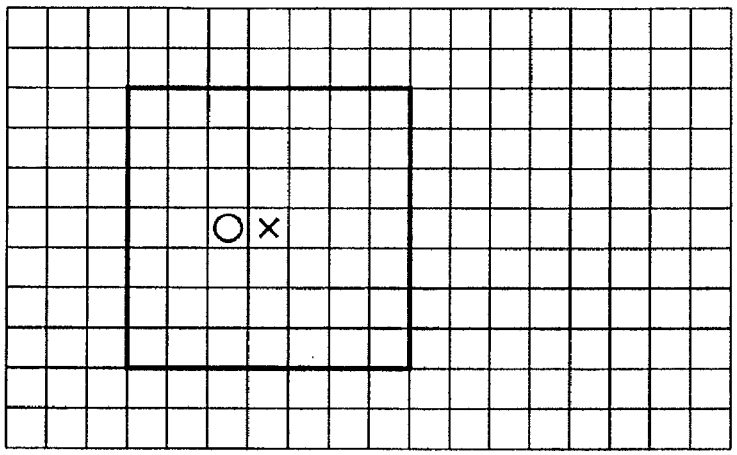
Figure 4:
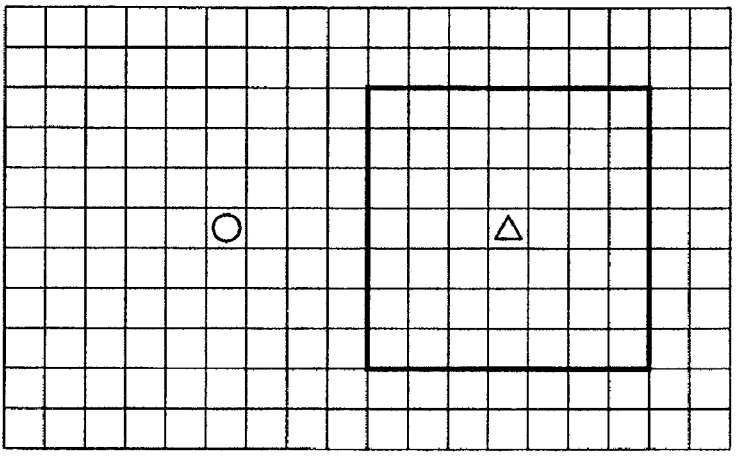

FIG. 4 is a view for explaining a processing unit of the image processes upon execution of the image processes.

A case will be explained below wherein the processing unit is a pixel unit. Assuming that a pixel indicated by "○" in an upper view of FIG. 4 is a pixel of interest (pixel to be processed), a region (7×7 region) defined by 7×7 pixels including the pixel of interest is set, as indicated by the bold line in the upper view of FIG. 4. A correction intensity for the pixel of interest is set using the image data in the 7×7 region set in this way, thus correcting the pixel of interest. After correction of the pixel of interest, a pixel that neighbors the pixel of interest is set as the next pixel of interest, as indicated by "x" in, for example, a middle view of FIG. 4, and a 7×7 region is set to have the pixel indicated by "x" as the pixel of interest, so as to similarly execute the correction processing. After that, the pixel of interest is similarly shifted pixel by pixel in turn and a new 7×7 region is set in each case, thus correcting all pixels to be corrected.

A case will be explained below wherein the processing unit is a region unit. A 7×7 region is set for a pixel indicated by "○" in the upper view of FIG. 4, and a correction intensity to be set for "○" is applied to a plurality of pixels, for example, all pixels, in the 7×7 region. As the next processing unit, a 7×7 region is set for a pixel indicated by "Δ" in a lower view of FIG. 4. In this way, the processing unit is shifted, so that the 7×7 region for "○" neighbors that for "Δ". However, the pixel unit is preferably used as the processing unit to set the correction intensity at higher accuracy. In the embodiments to be described hereinafter, the pixel unit will be described as the processing unit.

Figure 5:
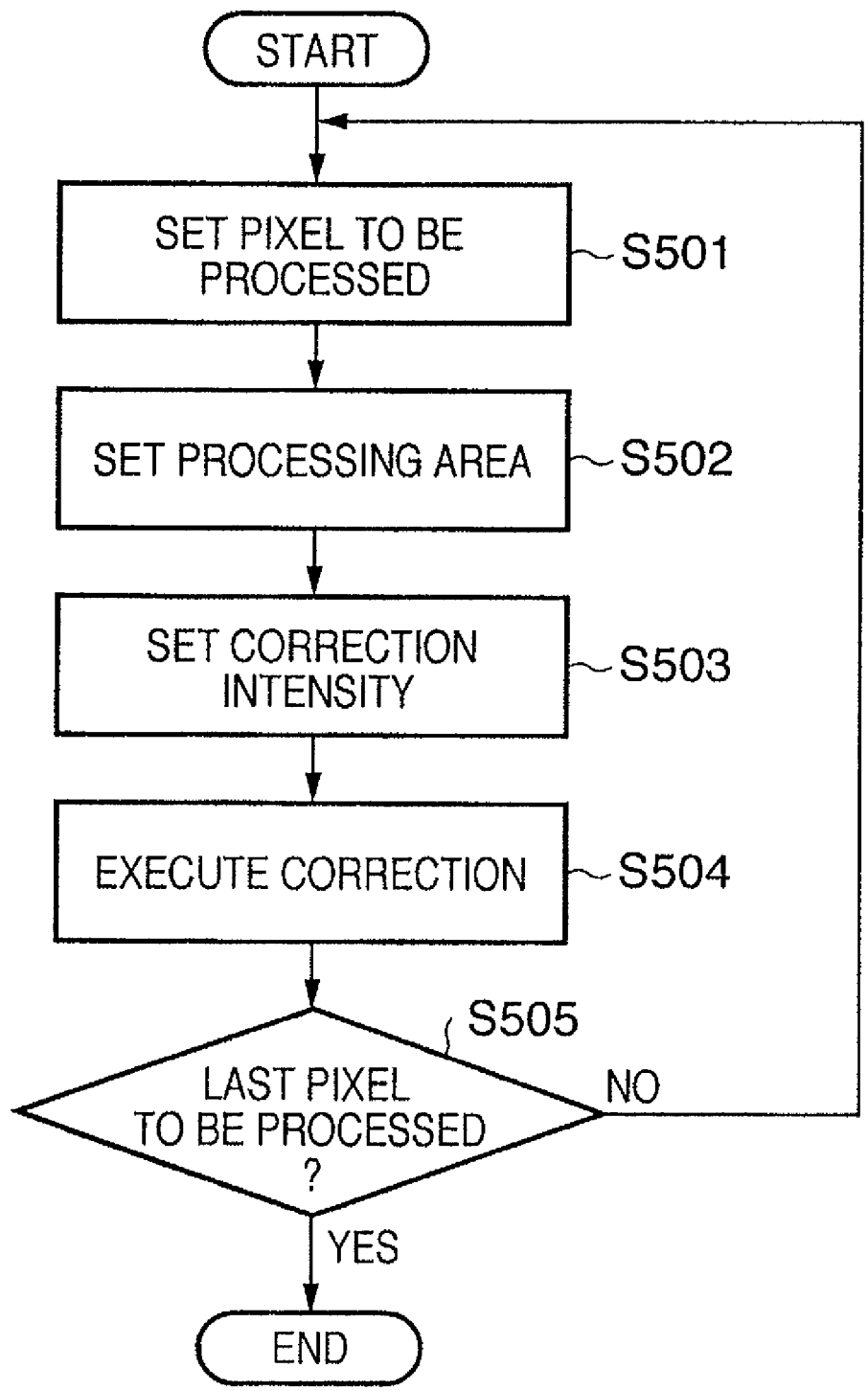
FIG. 5 is a flowchart for explaining the operation for shifting a processing unit.

FIG. 5 is a flowchart for explaining the operation for shifting the processing unit.

Step S501 is setting processing of a processing target (pixel to be processed). After the start of the processing, the CPU 211 sets a first pixel to be processed. If the process returns from step S505 to step S501, the CPU 211 sets the next pixel to be processed.

In step S502, the CPU 211 sets a processing region. The processing region is a region configured by a plurality of pixels (7×7 region) including the processing unit, as described above.

In step S503, the CPU 211 sets a correction intensity. That is, the CPU 211 sets a correction intensity for the processing unit. In step S504, the CPU 211 corrects the processing unit using the correction intensity set in step S503.

The CPU 211 determines the last correction target in step S505, that is, checks if the processed processing unit is the last one. If the processing unit is not the last one (NO), the process returns to step S501. If the processing unit is the last one (YES), this processing ends.

In replacement processing of this embodiment, the 7×7 region will be described as the processing region. This is because the pixel range of a document to be scanned by one pixel of the image sensing element (CCD or CIS) used in the scanning device 134 described using FIG. 1 and the scanning unit 214 described using FIG. 2 is designed to include six pixels or less. Although the pixel range to be scanned is designed to include six pixels or less, reflected light from a document that enters the image sensing element receives various influences due to float of a document from the document table, unevenness of a document, and the like. For this reason, one pixel of the image sensing element may scan a range exceeding six pixels. The embodiments to be described hereinafter show a plurality of graphs used to explain image signals obtained by scanning a document. However, these image signals are not always obtained from reflected light within six pixels or less.

Figure 6A:
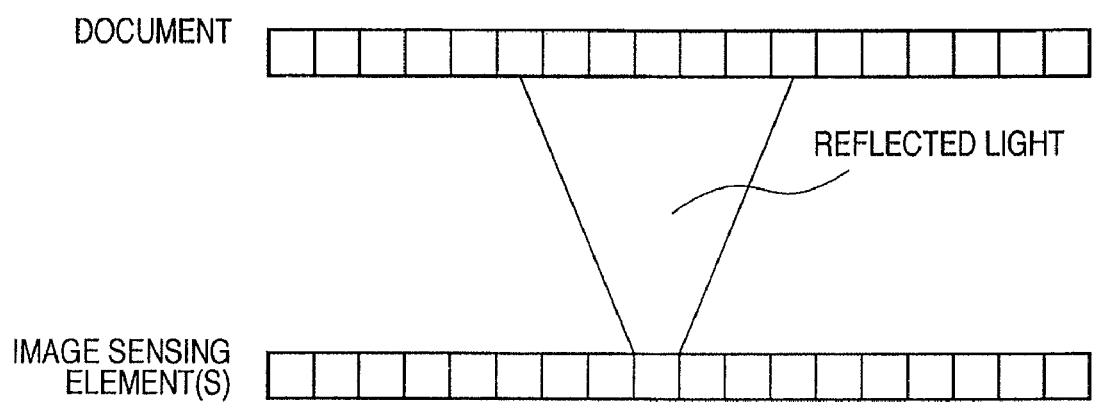
FIGS. 6A and 6B are views illustrating a range of reflected light which comes from a document and enters one pixel of an image sensing element.
Figure 6B:
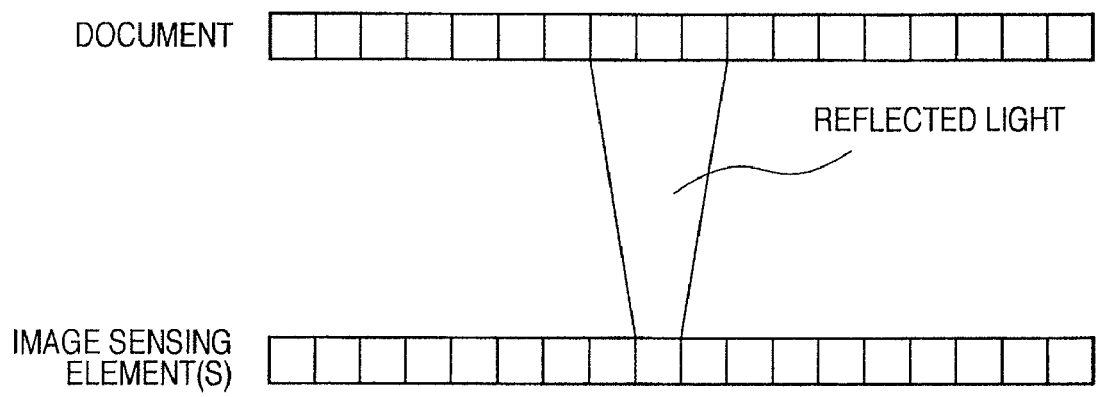

FIGS. 6A and 6B illustrate the range of reflected light that comes from a document and enters one pixel of the image sensing element. As shown in FIG. 6A, the image sensing element used in this embodiment is designed so that reflected light within six pixels from a 7-pixel range of a document enters one pixel of the image sensing element (as described above, reflected light that exceeds six pixels may enter in some cases). That is, reflected light from one pixel on a document influences seven pixels of the image sensing element. This causes edge blurring described in the paragraphs of the related art, and deteriorates sharpness.

Therefore, upon execution of the edge emphasis processing based on pixel value replacement, by selecting a replacement candidate from a pixel region less influenced by a document pixel corresponding to the pixel of interest, the edge emphasis effect can be enhanced. For this reason, in order to ensure a minimal region which is influenced by one pixel of a document image as the processing region, the 7×7 region is set as the processing region. However, in order to enhance the edge emphasis effect more, it is effective to set a region exceeding 7×7 pixels as a reference region. Also, when one pixel of the image sensing element is designed to receive reflected light from a 3-pixel range of a document, as shown in FIG. 6B, the processing region may be set as small as a 3×3 region. In this manner, the reference region can be set as needed in accordance with the performance of the image sensing element such as the number of pixels of the image sensing element influenced by one pixel of a document image, the spot size, the number of blurred pixels, Modulation Transfer Function (MTF), and the like.

Definitions and limitations of terms used in the description of the embodiments of the present invention will be described below.

In the embodiment to be described below, a fluctuation count will be described as the number of sign changes (the number of zero-crossing points) in brightness changes in a region of interest. However, the present invention is not limited to such specific definition. That is, the fluctuation count is defined as a value that expresses the frequency of occurrence of changes in value associated with image signals such as the number of zero-crossing points or spatial frequency of the first derivatives of values associated with image signals in the region of interest, the number of black-white changes after binarization, and the like.

In the embodiment to be described below, a fluctuation amount will be described as the absolute value (edge amount) of the brightness difference with respect to a pixel of interest. However, the present invention is not limited to such specific definition. That is, the fluctuation amount is defined as a value that expresses the difference (magnitude) of changes such as the absolute value of the first derivative of a value related to an image signal of a pixel of interest or the like. Alternatively, the fluctuation amount is defined as a value that representatively expresses the difference (magnitude) of changes of values related to image signals in a region of interest.

In the embodiment to be described below, a fluctuation acceleration will be described as a value obtained by further calculating a difference from the differences of brightness values in the region of interest. However, the present invention is not limited to such specific definition. That is, the fluctuation acceleration is defined as a value that expresses the acceleration of changes such as the second derivative of values associated with image signals in the region of interest and the like.

In the embodiment to be described below, a saturation will be explained as a maximum absolute value of image signal differences of respective colors of a pixel or region of interest. However, the present invention is not limited to such specific definition. The saturation is defined as a value that expresses the distance from the brightness axis.

As will be described in the embodiment to be described below, adaptive setting of a correction intensity is defined such that different correction intensities are set for each value in at least some value regions of those which the defined fluctuation count, fluctuation amount, fluctuation acceleration, and saturation can assume.

Details of the embodiment will be described below. Note that in the embodiment, an image signal is expressed by RGB components, and each component is expressed as an 8-bit integer value (0 to 255 in decimal). However, the range of the image signal is not limited to such a specific range, and may be set to fit the image processes. Note that white is expressed as R=G=B=255, and black is expressed as R=G=B=0.

<Details of Edge Processing Operation>

In this embodiment, the correction intensity set in step S503 above is an edge intensity, and execution of correction in step S504 is edge emphasis processing which replaces a pixel by a predetermined pixel value in a replacement pixel reference region, which is calculated from the correction intensity. Note that a replacement pixel reference range to be described later is adaptively set based on the fluctuation count and edge amount. That is, a pixel position to be replaced is determined from the replacement pixel reference range, and a pixel component (pixel of interest) at an input pixel position is replaced by that at a pixel position to be replaced.

Figure 7:
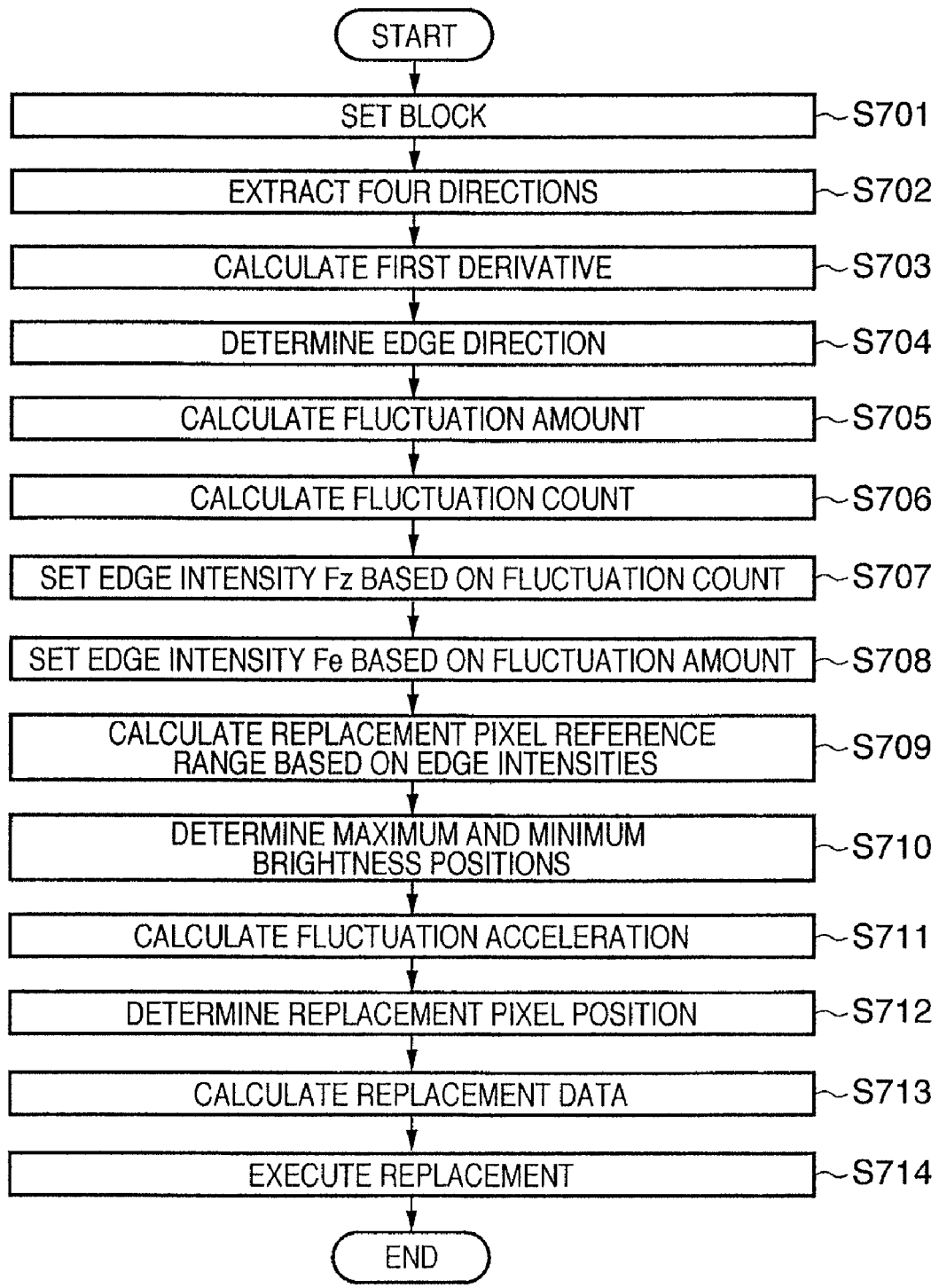
FIG. 7 is a detailed flowchart of an edge processing operation.

FIG. 7 is a detailed flowchart of the edge processing operation.

In step S701, the CPU 211 sets a processing region, that is, a 7×7 region including seven pixels in the horizontal direction and seven pixels in the vertical direction to have the pixel of interest as the center in an image configured by RGB multi-valued image signals. Furthermore, the CPU 211 generates a 7×7 processing region of brightness L by calculating brightness L from respective pixel values of the processing region by:

$$L=(R+2\times G+B)/4 \quad (2)$$

Note that this embodiment uses brightness L given by equation (2), but may adapt other brightness values derived using other equations. For example, L* of a uniform color space L*a*b* may be used as brightness, or a value Y of a YCbCr color space may be used as brightness.

Figure 8A:
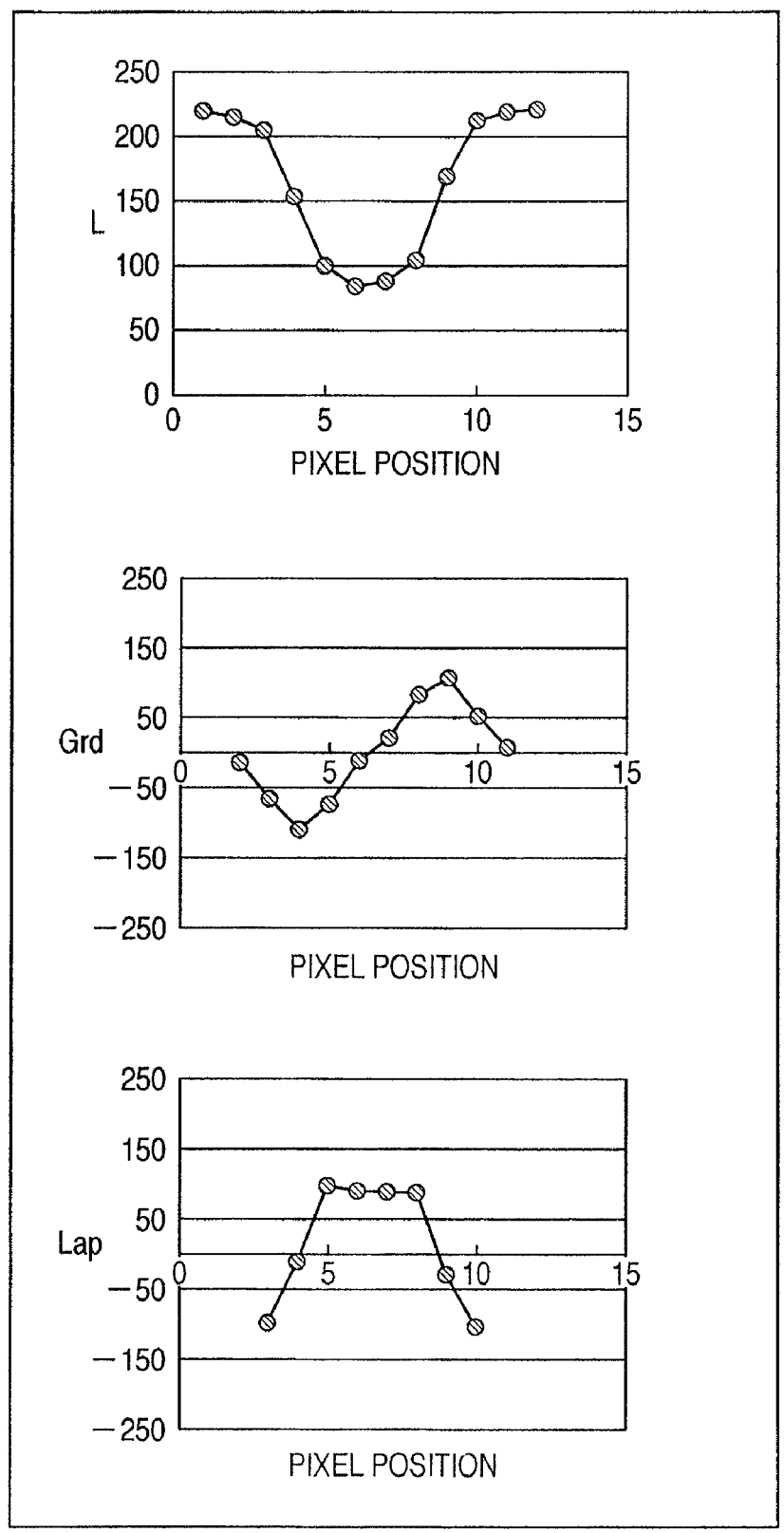
FIGS. 8A and 8B are graphs illustrating changes in brightness value, first derivative, and second derivative for two different patterns.
Figure 8B:
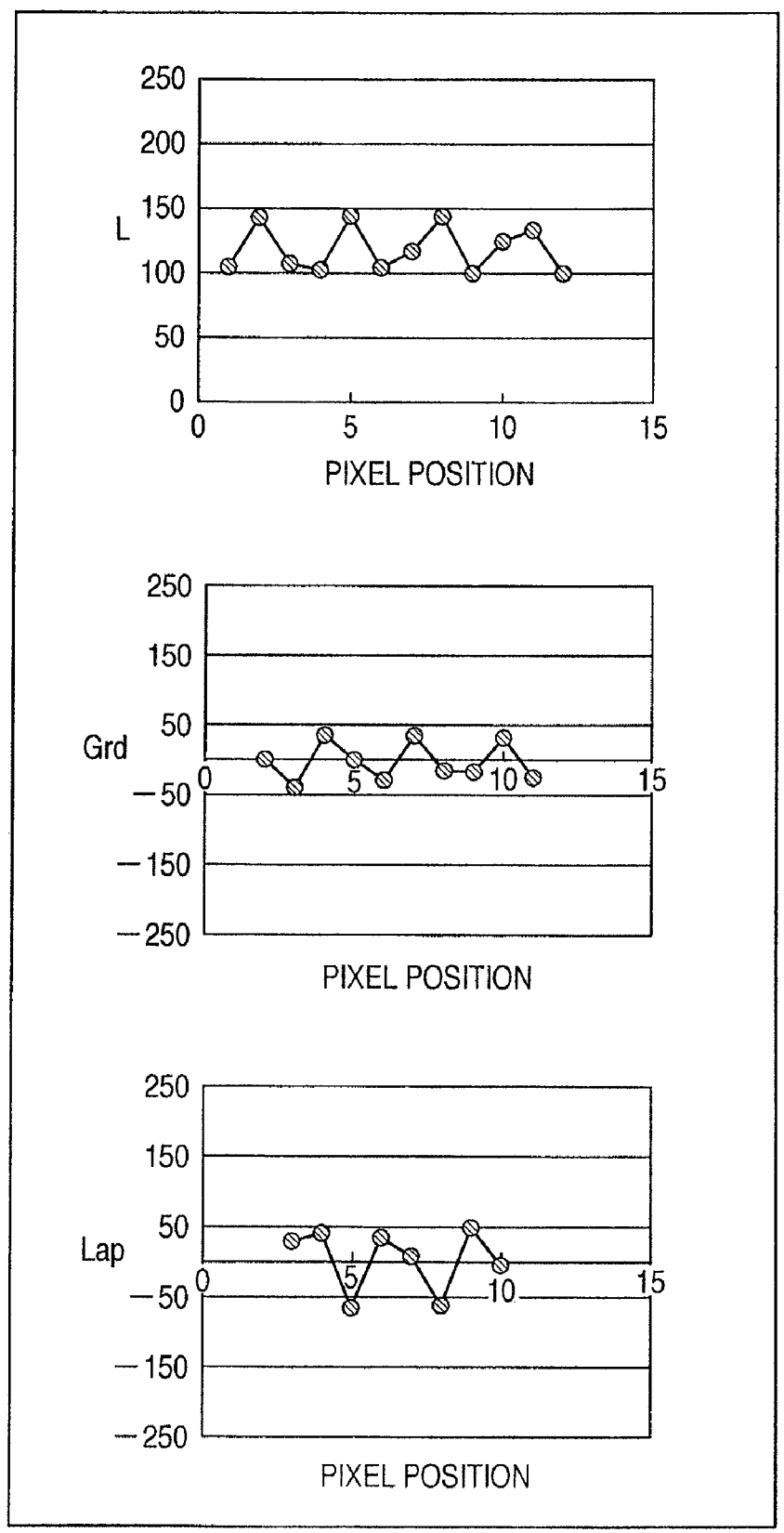

FIGS. 8A and 8B illustrate changes in brightness value (L), first derivative equivalent amount (Grd), and second derivative equivalent amount (Lap) corresponding to pixel positions for two types of patterns having different features. An upper graph of FIG. 8 shows a change in brightness value. FIG. 8A shows a change in brightness value corresponding to pixel positions upon scanning a black vertical line on a white background in the horizontal direction. On the other hand, FIG. 8B shows a change in brightness value corresponding to pixel positions upon scanning halftone dots, that line up in the horizontal direction on a white background, in the horizontal direction.

Figure 9:
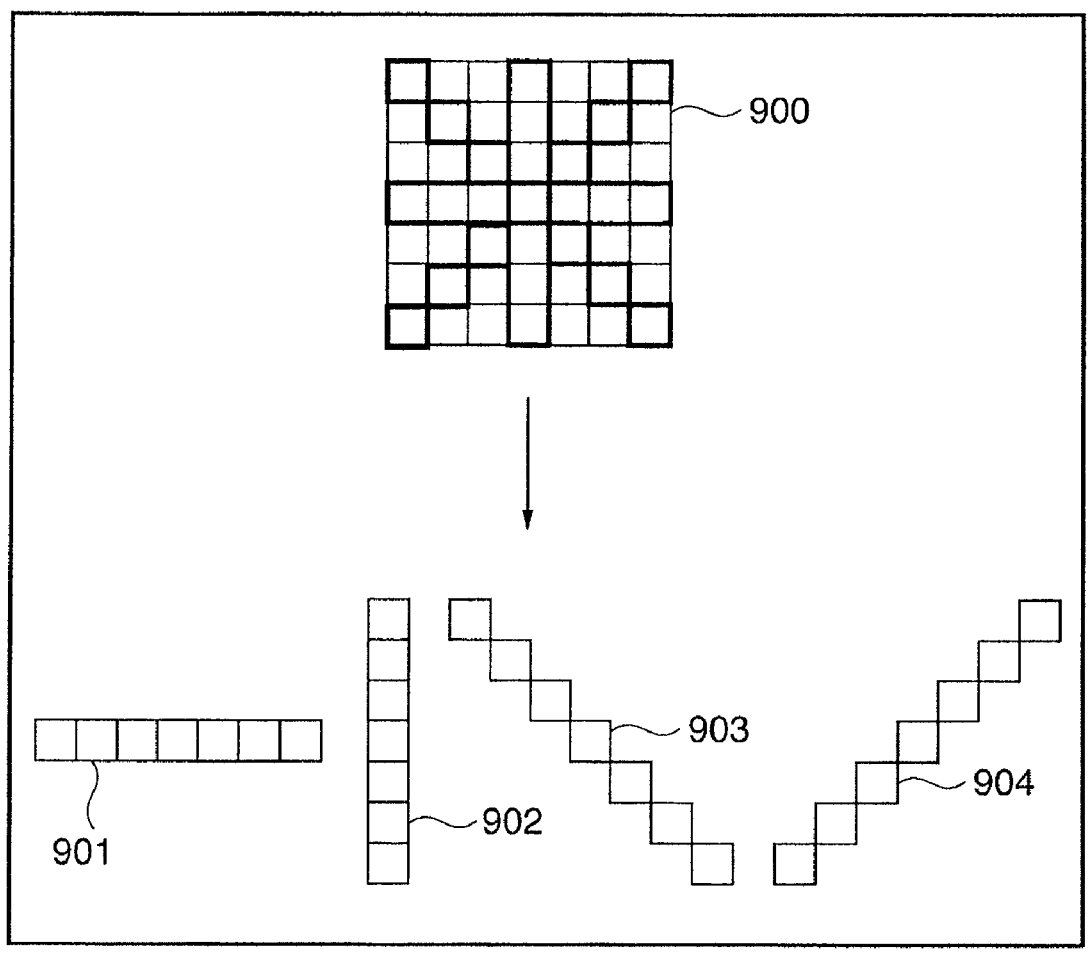
FIG. 9 is a view for explaining pixel value extraction from pixel sequences in four directions.

In step S702, the CPU 211 extracts, from the processing region of L generated in step S701, pixel values from pixel sequences in at least two directions. For example, the CPU 211 extracts pixel values of seven pixels in each of a total of four directions, that is, one horizontal direction 901, one vertical direction 902, and two oblique directions 903 and 904, as shown in FIG. 9.

In step S703, the CPU 211 calculates differences Grd corresponding to first derivatives of L of five pixels in each direction from L in the four directions extracted in step S702, as shown in FIG. 10, and using:

$$Grd(i)=L(i+1)-L(i-1) \quad (3)$$

where $L(i-1)$ is a pixel before pixel $L(i)$, and $L(i+1)$ is a pixel after pixel $L(i)$.

Note that the difference between two pixels before and after the pixel of interest is calculated so that the derived Grd value corresponds to each pixel position. However, other methods may be used. For example, differences between neighboring pixels may be calculated, or differences between pixels further separated from those before and after a given pixel described above may be calculated. In this case, interpolation processing or the like may be used together, so that the pixel position matches that where the Grd value is derived.

Middle graphs of FIGS. 8A and 8B show changes in Grd value calculated by applying equation (3) to the brightness values L in the upper graphs.

In step S704, the CPU 211 calculates Grd absolute values in the four directions at the position of the pixel of interest in Grd in the four directions calculated in step S703 and determines an edge direction. More specifically, the CPU 211 determines a direction that shows a maximum Grd absolute value of those in the four directions as an edge direction of the pixel of interest.

In step S705, the CPU 211 derives, as an edge amount, a maximum absolute value from five pixels of Grd of the edge direction calculated in step S703 in the edge direction determined in step S704. That is, an edge is stronger with increasing edge amount, and is close to flat with decreasing edge amount.

In step S706, the CPU 211 calculates a fluctuation count as a total of the four directions from the Grd values in the four directions calculated in step S703.

Figure 11:
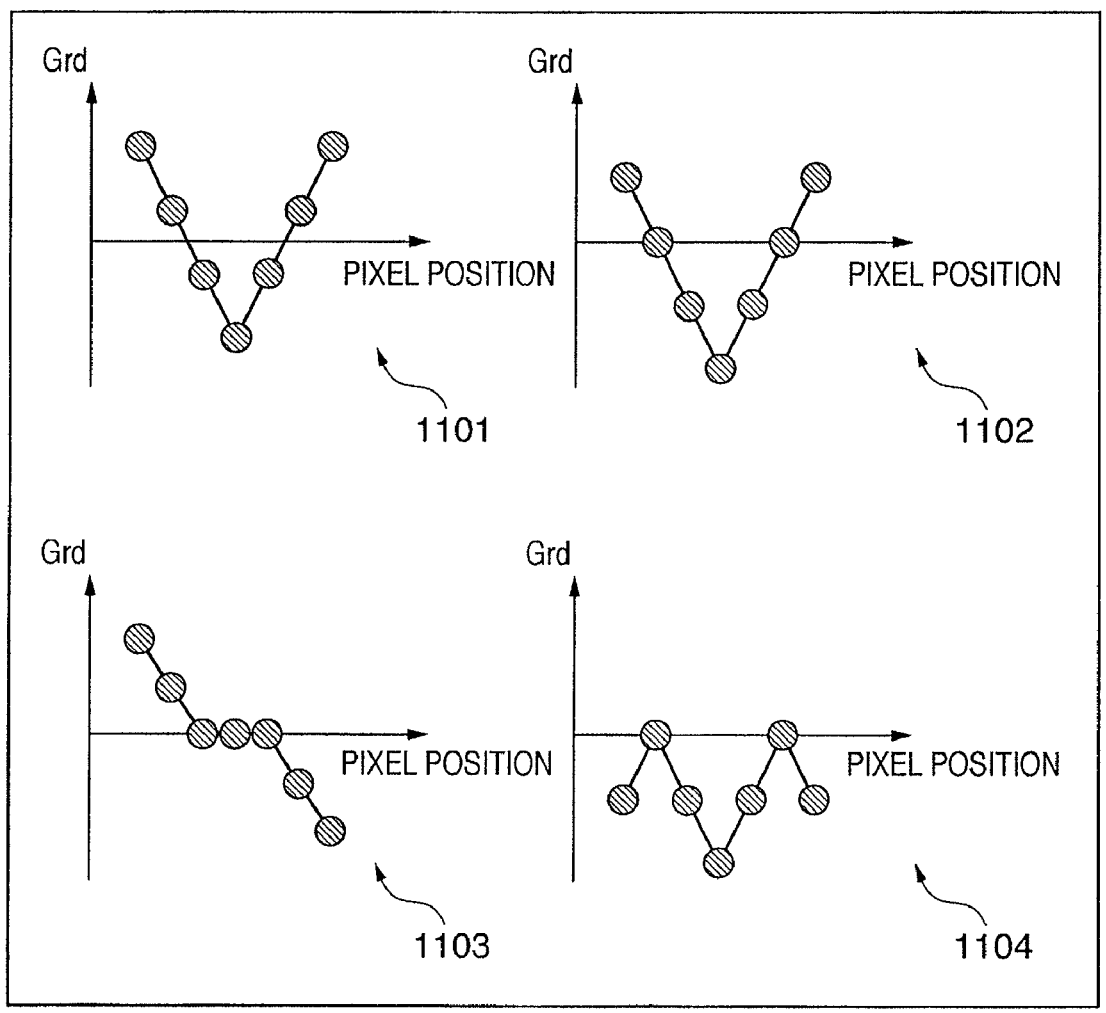
FIG. 11 shows graphs for explaining a fluctuation count.

FIG. 11 shows graphs for explaining a fluctuation count. The fluctuation count is the number of times the sign of Grd changes from + to − or vice versa, as shown in a graph 1101. Alternatively the fluctuation count (the number of zero-crossing points) of the pixel of interest is obtained by calculating the number of times the sign of Grd changes from + to 0 and then to − at the next pixel, or from − to 0 and then to + at the next pixel, as shown in a graph 1102. That is, the number of times of changes shown in each of the graphs 1101 and 1102 is counted as twice.

Note that this embodiment does not count, as the fluctuation count, a case in which the sign changes to sandwich zeros of a plurality of pixels, as shown in a graph 1103, or a case in which the Grd value becomes zero but its sign does not change, as shown in a graph 1104. When the Grd values assume zero at the plurality of pixels or when the Grd values become zero but their sign does not change, a bold line is likely to be determined. As will be described in step S708, however, an intensity different from that for a thin line in the graph 1101 or 1102 can be set for the bold line.

Figure 12:
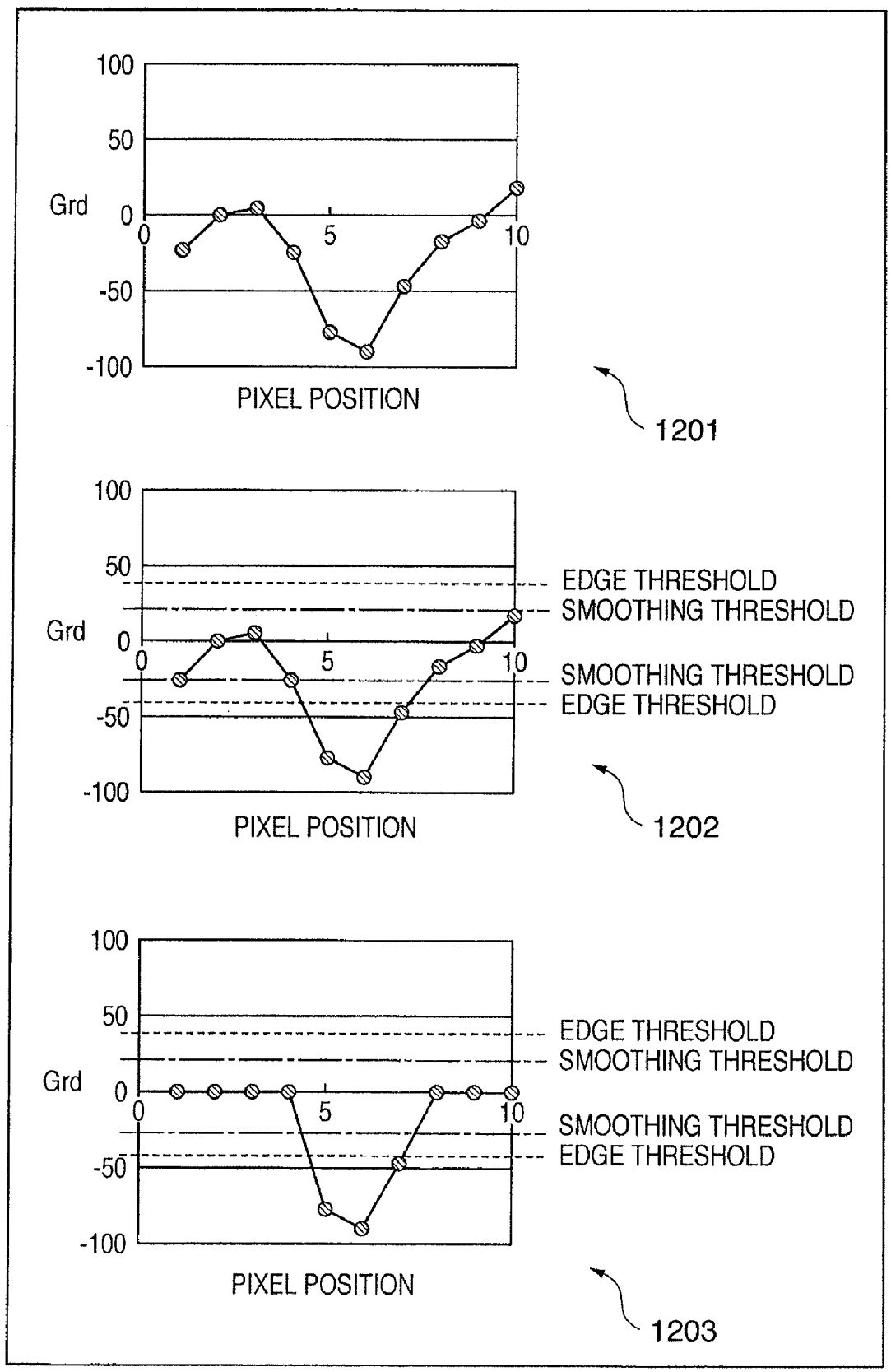
FIG. 12 shows graphs for explaining an edge threshold and smoothing threshold.

FIG. 12 shows graphs for explaining an edge threshold and smoothing threshold. As shown in FIGS. 8A and 8B, text tends to have a smaller fluctuation count than halftone. However, depending on the density uniformity of a document or shading accuracy, text often has changes with small amplitudes in Grd, as shown in a graph 1201. In such case, the fluctuation count increases like halftone, and if correction intensity setting processing (to be described later) is executed, an edge intensity close to that of halftone is undesirably set. Hence, when the edge amount calculated in step S705 is relatively large, that is, when it exceeds a set threshold, small Grd values are smoothed to zero to set an edge intensity with higher accuracy. More specifically, the edge amount calculated in step S705 is compared with a threshold (edge threshold), and if the edge amount exceeds the edge threshold, a smoothing threshold is set, as shown in a graph 1202. In case of Grd absolute values equal to or smaller than the smoothing threshold, the fluctuation count is counted to have Grd=0, as shown in a graph 1203. In this manner, the fluctuation count of text can be suppressed, and the edge intensity setting processing with high accuracy can be attained.

Figure 13:
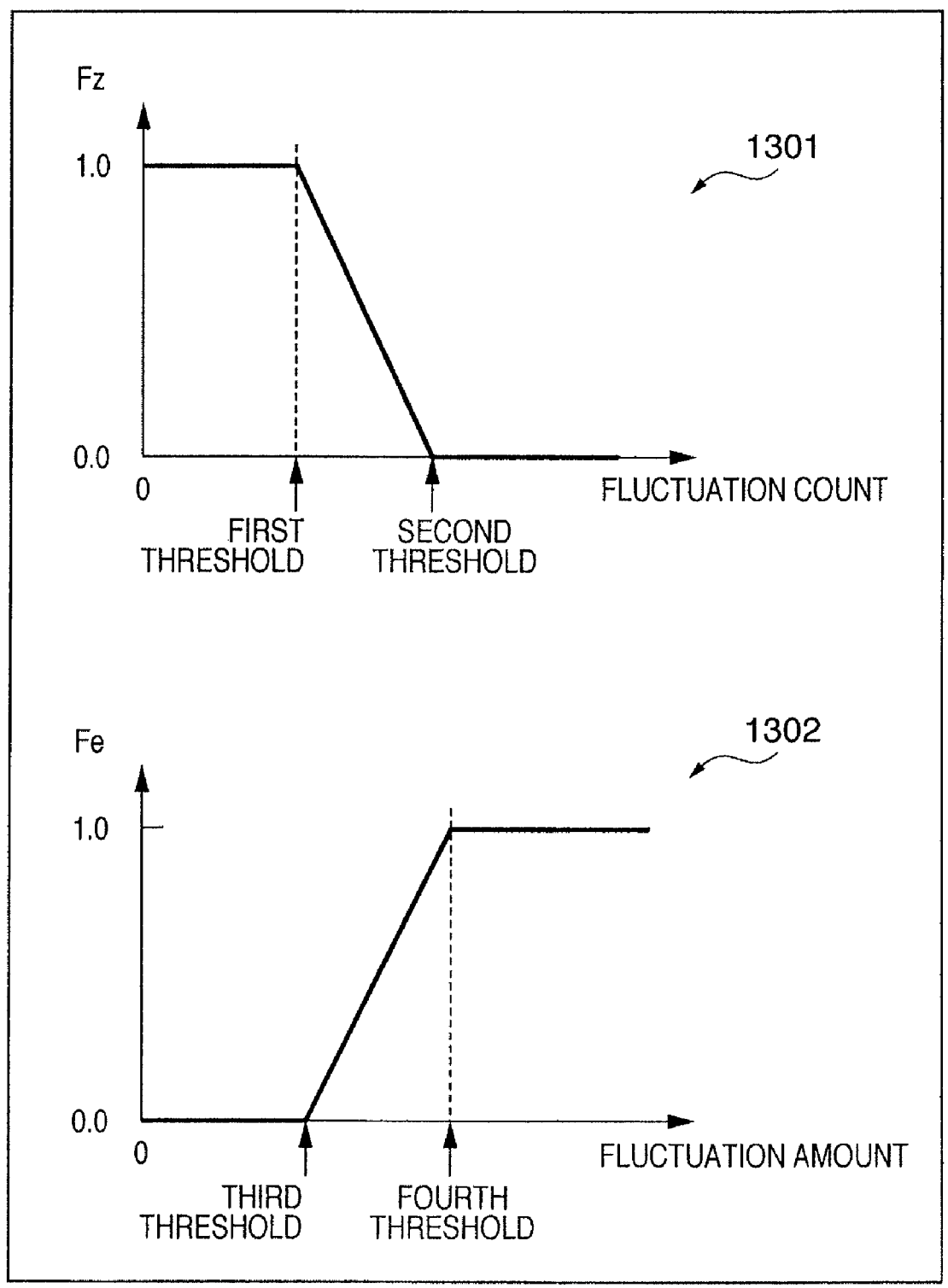
FIG. 13 shows graphs for explaining edge intensity settings.
Figure 14:
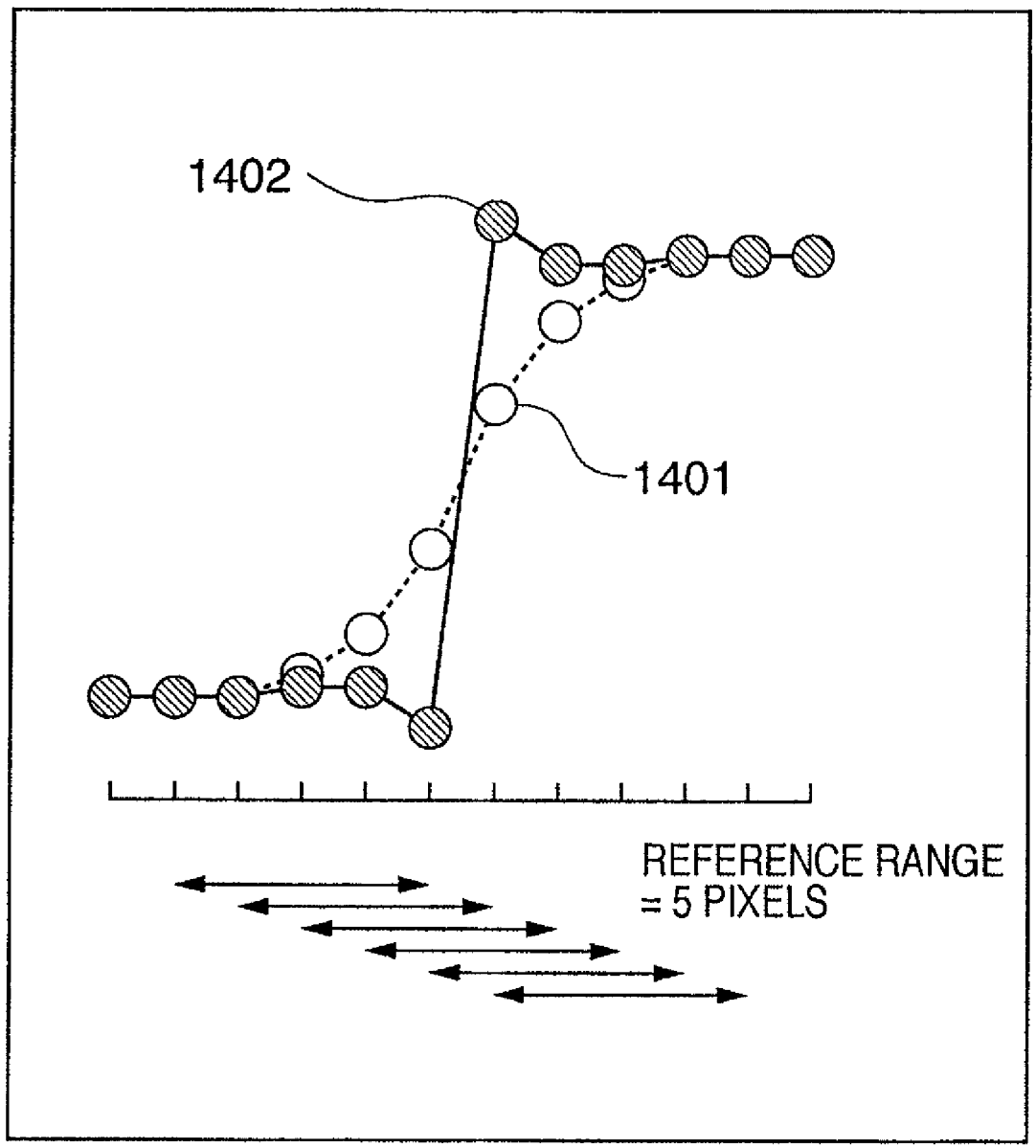
FIG. 14 is a graph showing the edge emphasis processing result of the prior art.

In step S707, the CPU 211 adaptively sets an edge intensity Fz in accordance with the fluctuation count calculated in step S706. A graph 1301 in FIG. 13 is used to explain the Fz setting in step S707: the abscissa plots the fluctuation count, and the ordinate plots Fz. In case of the fluctuation count which is smaller than a first threshold and with which a text region is more likely to be determined, Fz is set to be 1 to emphasize the edge. In case of the fluctuation count which is larger than a second threshold and with which a halftone region that readily causes moiré at high LPI is more likely to be determined, Fz is set to be 0 so as not to emphasize moiré. In case of the fluctuation count falling within a range between the first and second thresholds (both inclusive), Fz is adaptively set for each fluctuation count to obscure switching of the processes. More specifically, the CPU 211 can adaptively set Fz using equation (4) below corresponding to the graph 1301:

$$Fz=(\text{second threshold}-\text{fluctuation count})/(\text{second threshold}-\text{first threshold}) \quad (4)$$

Note that when the fluctuation count=first threshold, Fz=1; when the fluctuation count=second threshold, Fz=0.

In step S708, the CPU 211 adaptively sets an edge intensity Fe in accordance with the edge amount calculated in step S705. A graph 1302 in FIG. 13 is used to explain the Fe setting in step S708: the abscissa plots the edge amount, and the ordinate plots Fe. In case of the fluctuation amount which is smaller than a third threshold and with which a flat region is more likely to be determined, Fe=0 is set so as not to roughen an image by emphasizing small fluctuation amounts. In case of the fluctuation amount which is larger than a fourth threshold and with which an edge region is more likely to be determined, Fe=1 is set to apply edge emphasis. In case of the fluctuation amount falling within a range between the third and fourth thresholds (both inclusive), different Fe is adaptively set for each edge amount, so as to obscure switching of the processes. More specifically, the CPU 211 can adaptively set Fe using equation (5) below corresponding to the graph 1302:

$$Fe=(\text{edge amount}-\text{third threshold})/(\text{fourth threshold}-\text{third threshold}) \quad (5)$$

Note that when the edge amount=third threshold, Fe=0; when the edge amount=fourth threshold, Fe=1.

In step S709, the CPU 211 calculates a replacement pixel reference range based on the edge intensity using Fz calculated in step S707 and Fe calculated in step S708. Since this embodiment adopts 7×7 pixels as the processing unit, as described above, a maximum reference range is defined by 7 pixels, and the reference range is determined based on the Fz and Fe values. A calculation method of the replacement pixel reference range is given by:

$$\text{Replacement pixel reference range}=\text{maximum reference range}\times Fz\times Fe \quad (6)$$

Since the ranges of the Fz and Fe values are set to meet $0 \leq Fz \leq 1$ and $0 \leq Fe \leq 1$, the reference range is defined by the value obtained by multiplying the maximum reference range by Fz and Fe.

In order to match the reference range from the central pixel to the pixel positions, the replacement pixel reference range may be adjusted to be defined by an odd number of pixels. For example, since this embodiment defines the processing region by 7×7 pixels, a value that can be assumed is 7, 5, 3, or 1. More specifically, when the value of the replacement pixel reference range calculated using equation (6) meets one of the following inequalities, the replacement pixel reference range can be defined by an odd number of pixels as follows:

when 0≦replacement pixel reference range<2, replacement pixel reference range is set to be "1";

when 2≦replacement pixel reference range<4, replacement pixel reference range is set to be "3";

when 4≦replacement pixel reference range<6, replacement pixel reference range is set to be "5"; or when 6≦replacement pixel reference range≦7, replacement pixel reference range is set to be "7".

In step S710, the CPU 211 extracts a pixel sequence in the edge direction determined in step S704 from those in the four directions extracted in step S702. The CPU 211 extracts the replacement pixel reference range calculated in step S709 to have the pixel of interest as the center, and determines pixel positions with maximum L and minimum L within that range.

Figure 15:
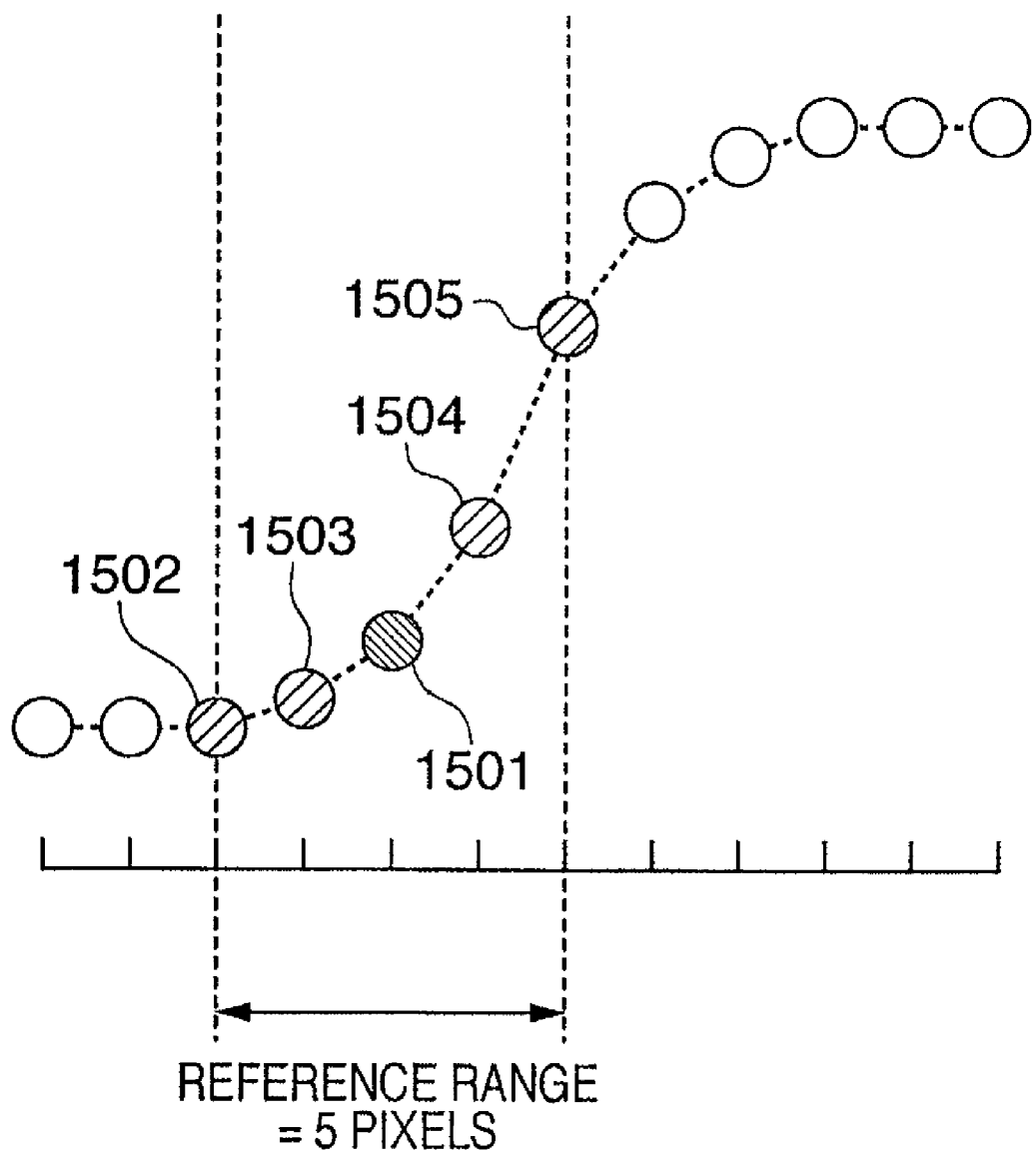
FIG. 15 is a graph for explaining the derivation sequence of pixel positions with maximum L and minimum L (reference range=5 pixels)

FIG. 15 is a graph for explaining the derivation sequence of the pixel positions with maximum L and minimum L when the replacement pixel reference range is defined by five pixels. In FIG. 15, a black dot 1501 represents the central pixel, and gray dots 1502 to 1505 represent pixels within the replacement pixel reference range. Since the replacement pixel reference range is defined by five pixels, pixels that can be replacement candidates are those at positions of ±2 pixels from the center, and the pixel positions with maximum L and minimum L are calculated from these five pixels. In FIG. 15, maximum L corresponds to the pixel position of the gray dot 1505, and minimum L corresponds to that of gray dot 1502.

Figure 16:
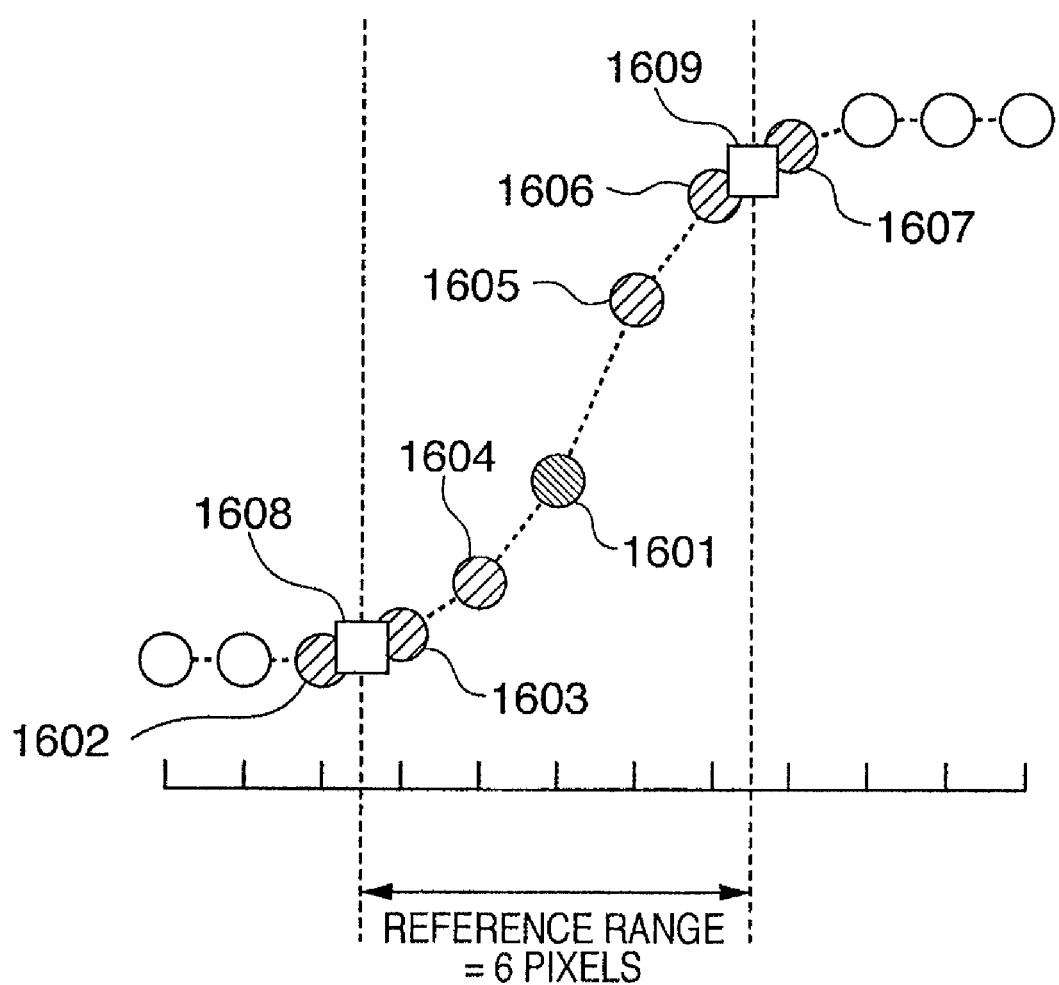
FIG. 16 is a graph for explaining the derivation sequence of pixel positions with maximum L and minimum L (reference range=6 pixels)

When the value calculated in step S709 is not limited to an odd value, values located at ±(replacement pixel reference range−1)/2 from the central pixel are calculated from two neighboring pixels by interpolation. That is, the outermost positions of the replacement pixel reference range assume pixel values calculated by interpolation, and the remaining positions assume pixel values according to the pixel positions. FIG. 16 is a graph for explaining the derivation sequence of pixel positions with maximum L and minimum L when the replacement pixel reference range is defined by six pixels. In FIG. 16, a black dot 1601 represents the central pixel, and gray dots 1603 to 1606 and white squares 1608 and 1609 represent pixels within the replacement pixel reference range. Note that the white square 1608 represents a pixel obtained from the gray dots 1602 and 1603 by interpolation, and the white square 1609 represents a pixel obtained from the gray dots 1606 and 1607 by interpolation. Since the replacement pixel reference range is defined by six pixels, pixels which can be replacement candidates are those up to the positions of ±2.5 pixels from the center. For this reason, the white squares 1608 and 1609 as outermost pixels are calculated by interpolating two neighboring pixels, as described above, and the pixel positions with maximum L and minimum L are calculated from these seven pixels. In FIG. 16, maximum L corresponds to the pixel position of the white square 1609, and minimum L corresponds to that of white square 1608.

In step S711, the CPU 211 calculates a fluctuation acceleration Lap as the second derivative of three pixels from Grd of the edge direction calculated in step S703 in the edge direction determined in step S704. The calculation method of the fluctuation acceleration is described by:

$$Lap(i)=Grd(i+1)-Grd(i-1) \quad (7)$$

where Grd(i−1) is a pixel before pixel Grd(i), and Grd(i+1) is a pixel after that pixel. Note that the calculation method of the fluctuation acceleration is not limited to such specific equation, and the difference between neighbor Grd values may be calculated.

Lower graphs of FIGS. 8A and 8B respectively show changes in Lap values calculated by applying equation (7) to Grd shown in the upper graphs.

In step S712, the CPU 211 determines a replacement pixel position based on the pixel positions with maximum L and minimum L determined in step S710 and the fluctuation accelerations Lap calculated in step S711.

FIG. 19 is a table for explaining the determination method of the replacement pixel position. In FIG. 8A or 8B, when the sign of Lap is +, L of the pixel of interest tends to assume a value, the magnitude of which is closer to minimum L than maximum L; when the sign of Lap is −, L of the pixel of interest tends to assume a value, the magnitude of which is closer to maximum L than minimum L. Hence, in this embodiment, the replacement pixel position is determined, as shown in FIG. 19. Note that handling of the edge center where Lap of the pixel of interest becomes zero is not limited to FIG. 19. When Lap of the pixel of interest is zero, the pixel position with maximum L or minimum L may be determined as the replacement pixel position.

In step S713, the CPU 211 calculates a replacement level using the pixel value of the replacement pixel position determined in step S712. That is, the CPU 211 extracts RGB values of the replacement pixel position determined in step S712 from the RGB 7×7 regions set in step S701. If the determination result in step S712 indicates a position between actual pixels, RGB values are calculated from neighbor pixels by interpolation.

In step S714, the CPU 211 replaces the RGB values of the pixel of interest by those calculated in step S713.

Since the image data is processed via the aforementioned steps, an image edge part is emphasized.

Figure 17:
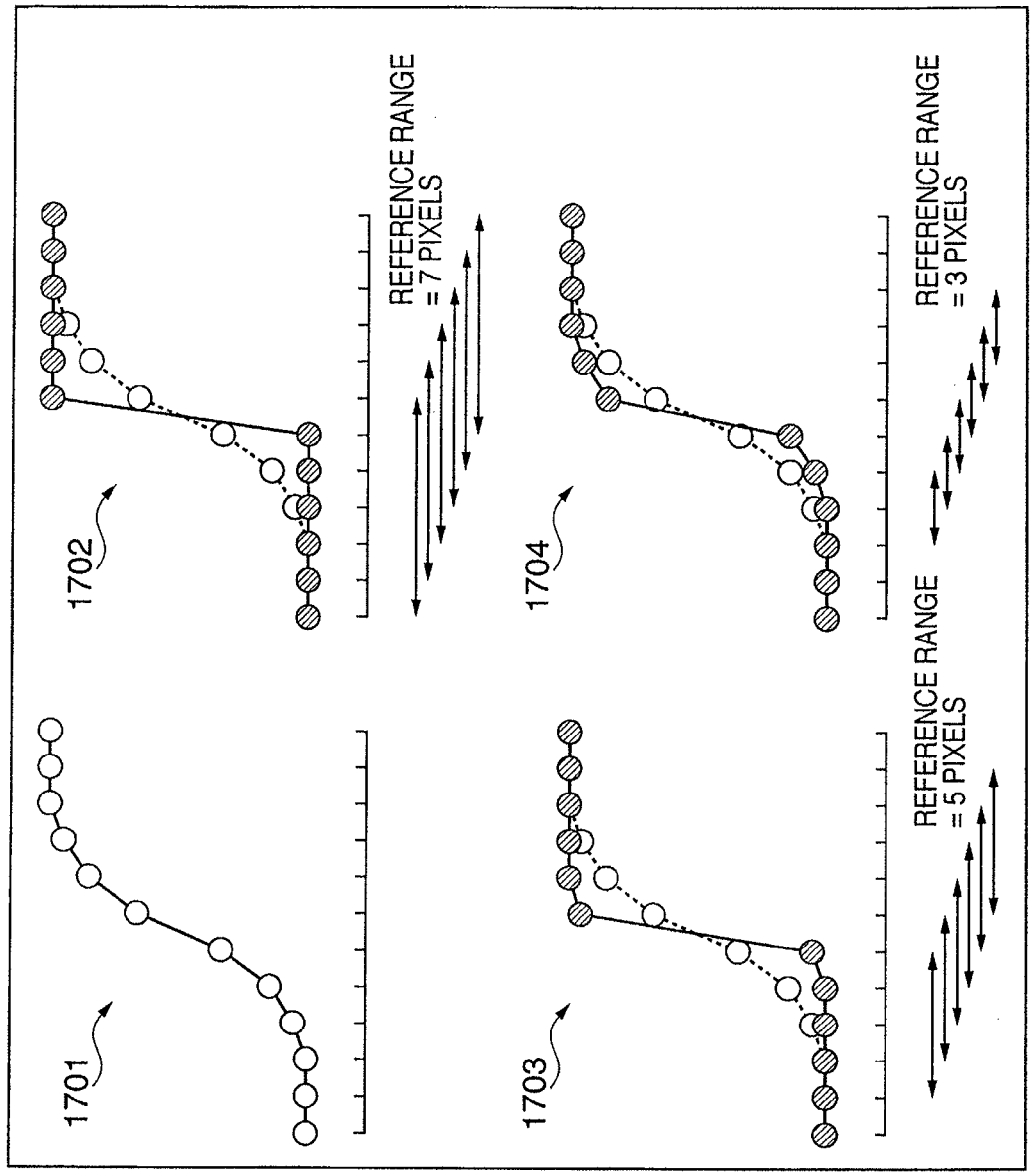
FIG. 17 shows graphs of the edge emphasis processing results when a replacement pixel reference range is changed.

FIG. 17 shows graphs illustrating the edge emphasis results when the replacement pixel reference range is changed for an identical image. In FIG. 17, white dots represent an original image, and black dots represent edge modification processing results.

A graph 1701 shows a change in brightness value L of the original image: the ordinate plots L values, the abscissa plots pixel positions, and white dots represent L values corresponding to respective pixel positions. A graph 1702 represents the edge modification processing result when the replacement pixel reference range is defined by seven pixels. A graph 1704 represents the edge modification processing result when the replacement pixel reference range is defined by three pixels. A graph 1703 represents the edge modification processing result when the replacement pixel reference range is defined by five pixels.

When the processing region (block) of the original image includes a character image or line image, the value of equation (6) above tends to be large; when the processing region (block) includes a natural image, that value tends to be small. That is, the graph 1702 indicates that when the processing region (block) includes a character image or line image, an image whose range with tonality decreases, and which is close to a binary image is obtained. On the other hand, as can be seen from the graph 1704, when the block includes a natural image, an image whose edge is emphasized while leaving the tonality of the original image is obtained. That is, FIG. 17 explicitly shows the effect of changing the replacement pixel reference range according to an image within the block as a characteristic feature of the present invention.

Figure 18:
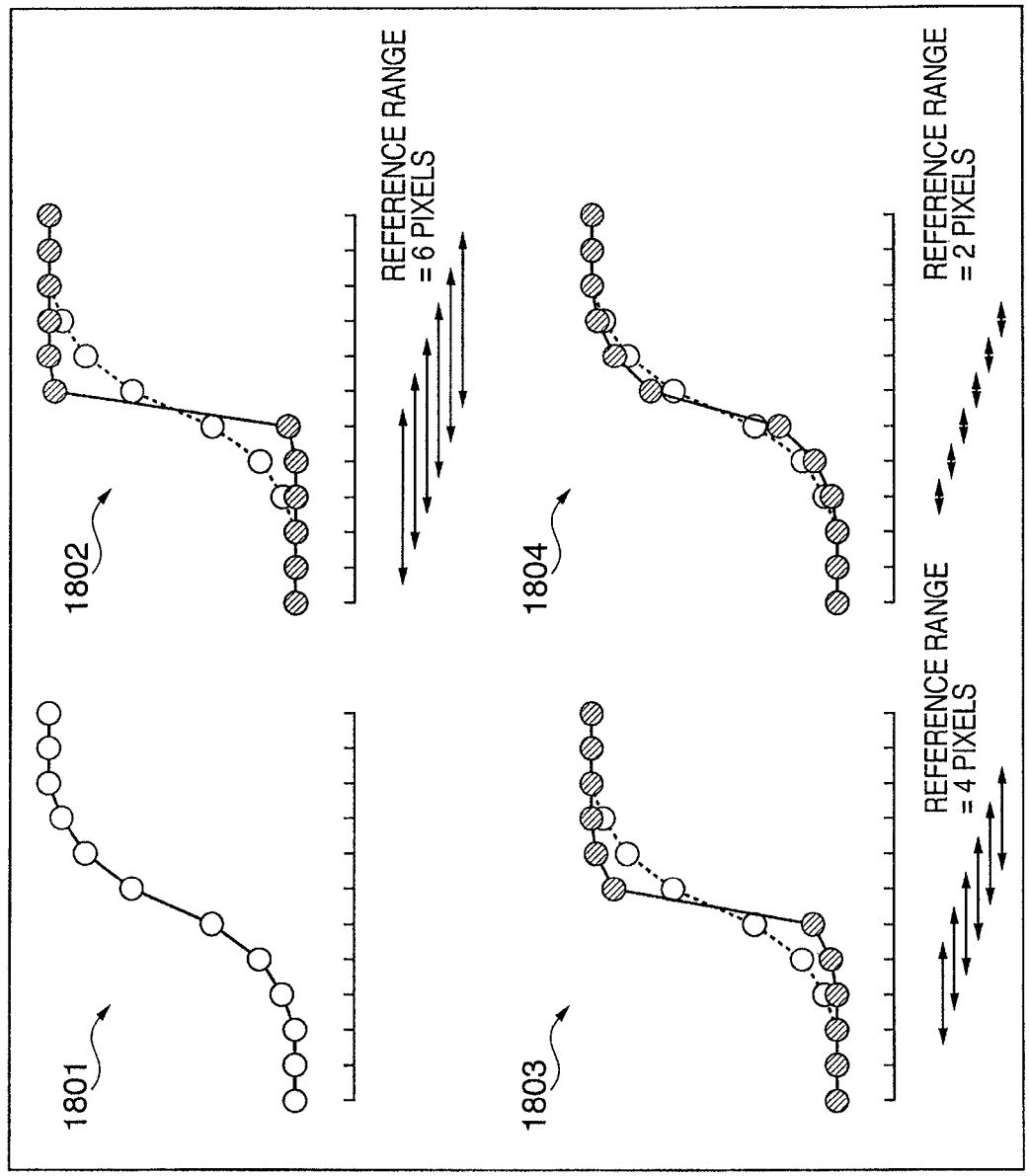
FIG. 18 shows graphs of the edge emphasis results when the numbers of pixels of the reference range are set to be even numbers.

FIG. 18 shows graphs illustrating the edge emphasis results when the replacement pixel reference range which is set to be defined by an even number of pixels is changed for an identical image. A graph 1801 represents an original image as in the graph 1701. A graph 1802 represents the edge modification processing result when the replacement pixel reference range is defined by six pixels. A graph 1804 represents the edge modification processing result when the replacement pixel reference range is defined by two pixels. A graph 1803 represents the edge modification processing result when the replacement pixel reference range is defined by four pixels. FIG. 18 is different from FIG. 17 in that the replacement pixel reference range does not match the pixel positions on the original image. However, as can be seen from FIG. 18, an image whose edge is emphasized while leaving the tonality of the original image as the replacement pixel reference range becomes smaller is obtained.

When the replacement pixel reference range does not match actual pixel positions, as shown in FIG. 18, maximum L and minimum L can be calculated by generating virtual pixels as the outermost pixel positions obtained by interpolation using neighbor pixels. With this method, detailed control can be made independently of the number of reference pixels, and satisfactory edge modification can be applied in correspondence with the image type. In FIG. 18, the replacement pixel reference range is defined by integer values, that is, 2, 4, and 6 for the sake of descriptive convenience. However, since the outermost pixel positions are calculated by interpolation using neighbor pixels, the replacement pixel reference range may be expressed by decimal values.

As described above, in the MFP according to the first embodiment, the edge emphasis technique that can eliminate image deterioration of a digital image can be provided. Since the edge intensity is determined based on the fluctuation count and edge amount in a block, edge emphasis of a halftone region can be eliminated. Since edge processing based on pixel replacement is adopted, a reduction of overshoot and undershoot at an edge part can be attained. In this manner, a high-resolution, multi-gradation output apparatus can output a high-quality image free from any bordering.

(Modification)

In the first embodiment, the edge intensities are determined based on the fluctuation count and edge amount in a block in steps S707 and S708. However, the method of setting the edge intensities is not limited to such specific method.

For example, the type of a document image may be accepted from the user using a user interface (UI). At this time, the type for the overall document image may be accepted, or the types of a plurality of regions obtained by separating an image may be accepted. By determining the edge intensities for the entire image or each separated region, and executing processing, the same effects as in the first embodiment can be obtained.

The edge intensities may be set based on the type of print medium output in a copy mode. For example, when a print medium is plain paper, it is determined that a document to be copied includes character images or line images, and the edge intensities Fz and Fe are set to be 1, thus applying strong edge modification processing to the entire image. On the other hand, when a print medium is photo paper, it is determined that a document to be copied includes a natural image, and the edge intensities Fz and Fe are set to be values close to zero, thus applying weak edge modification processing to the entire image.

Other Embodiments

The embodiments of the present invention have been explained in detail. The present invention may be applied to either a system constituted by a plurality of devices, or an apparatus consisting of a single device.

Note that the present invention is also achieved by directly or remotely supplying a program that implements the functions of the aforementioned embodiments to a system or apparatus, and reading out and executing the supplied program code by a computer of that system or apparatus. Therefore, the technical scope of the present invention includes the program code itself installed in a computer to implement the functional processes of the present invention using the computer.

In this case, the form of program is not particularly limited, and an object code, a program to be executed by an interpreter, script data to be supplied to an OS, and the like may be used as long as they have the program function.

As a recording medium for supplying the program, for example, a floppy® disk, hard disk, optical disk (CD, DVD), and magneto-optical disk, magnetic tape, nonvolatile memory card, ROM, and the like may be used.

As another program supply method, the program may be supplied as follows. That is, a connection is established to a homepage on the Internet using a browser of a client computer, and the program itself according to the present invention or a compressed file that includes an automatic installation function may be downloaded to a recording medium such as a hard disk or the like. Also, the program code that forms the program of the present invention may be segmented into a plurality of files, which may be downloaded from different homepages. That is, the claims of the present invention include a WWW server which makes a plurality of users download a program required to implement the functional processes of the present invention by the computer.

A storage medium such as a CD-ROM or the like, which stores the encrypted program of the present invention, may be delivered to the users. The user who has cleared a predetermined condition may be allowed to download key information that decrypts the program from a homepage via the Internet, and the encrypted program may be executed using that key information to be installed on a computer, thus implementing the present invention.

Moreover, the functions of the aforementioned embodiments can be implemented not only by executing the readout program by the computer but also by some or all of actual processes executed by an OS or the like which runs on a computer based on instructions of the program.

In addition, the functions of the aforementioned embodiments can also be implemented by some or all of actual processes executed by a CPU equipped on a function expansion board or unit, which is inserted into or connected to the computer, based on instruction of the program read out from the recording medium, after the program is written in a memory equipped on the function expansion board or unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-184845 filed Jul. 4, 2006 which hereby incorporated by reference herein in entirety.

What is claimed is:

1. An image processing apparatus for processing image data, comprising:
    a region setting unit constructed to set a region configured by a plurality of pixels including a pixel of interest;
    a brightness value derivation unit constructed to derive brightness values of the pixels in the region;
    a first derivative derivation unit constructed to derive first derivatives of the brightness values derived by said brightness value derivation unit for a plurality of pixel sequences in different directions, which include the pixel of interest;
    an edge direction determination unit constructed to determine an edge direction of brightness at a position of the pixel of interest based on the results of the first derivatives at positions of the pixel of interest in the respective pixel sequences derived by said first derivative derivation unit;
    a range determination unit constructed to determine a pixel sequence range, which is to undergo pixel value replacement, based on the first derivatives at respective positions of a plurality of pixels which line up in the edge direction determined by said edge direction determination unit; and
    a replacement unit constructed to calculate second derivatives of brightness values along a lineup direction of the pixels in the pixel sequence range, to replace a pixel value of the pixel of interest by a pixel value of a pixel which has a minimum brightness value in the pixel sequence range when the second derivative at the position of the pixel of interest assumes a positive value, and to replace a pixel value of the pixel of interest by a pixel value of a pixel which has a maximum brightness value in the pixel sequence range when the second derivative at the position of the pixel of interest assumes a negative value,
    wherein said range determination unit comprises:
    a fluctuation count derivation unit constructed to derive a fluctuation count of brightness values based on the first derivatives at the respective positions of the plurality of pixels which line up in the edge direction; and
    a fluctuation amount derivation unit constructed to derive a fluctuation amount of brightness values based on the first derivatives at the respective positions of the plurality of pixels which line up in the edge direction, and
    said range determination unit determines the pixel sequence range, which is to undergo pixel replacement, based on at least one of the fluctuation count and the fluctuation amount,
    wherein said range determination unit comprises a first comparison unit constructed to compare the fluctuation count with a first threshold and a second threshold larger than the first threshold, sets the pixel sequence range to be a designated maximum range when the fluctuation count is smaller than the first threshold, sets the pixel sequence range to a designated minimum range when the fluctuation count is larger than the second threshold, and sets the pixel sequence range by linear interpolation using the maximum range and the minimum range when the fluctuation count is larger than the first threshold and is smaller than the second threshold.

2. An image processing apparatus for processing image data, comprising:

a region setting unit constructed to set a region configured by a plurality of pixels including a pixel of interest;

a brightness value derivation unit constructed to derive brightness values of the pixels in the region;

a first derivative derivation unit constructed to derive first derivatives of the brightness values derived by said brightness value derivation unit for a plurality of pixel sequences in different directions, which include the pixel of interest;

an edge direction determination unit constructed to determine an edge direction of brightness at a position of the pixel of interest based on the results of the first derivatives at positions of the pixel of interest in the respective pixel sequences derived by said first derivative derivation unit;

a range determination unit constructed to determine a pixel sequence range, which is to undergo pixel value replacement, based on the first derivatives at respective positions of a plurality of pixels which line up in the edge direction determined by said edge direction determination unit; and a replacement unit constructed to calculate second derivatives of brightness values along a lineup direction of the pixels in the pixel sequence range, to replace a pixel value of the pixel of interest by a pixel value of a pixel which has a minimum brightness value in the pixel sequence range when the second derivative at the position of the pixel of interest assumes a positive value, and to replace a pixel value of the pixel of interest by a pixel value of a pixel which has a maximum brightness value in the pixel sequence range when the second derivative at the position of the pixel of interest assumes a negative value, wherein said range determination unit comprises:

a fluctuation count derivation unit constructed to derive a fluctuation count of brightness values based on the first derivatives at the respective positions of the plurality of pixels which line up in the edge direction; and a fluctuation amount derivation unit constructed to derive a fluctuation amount of brightness values based on the first derivatives at the respective positions of the plurality of pixels which line up in the edge direction, and said range determination unit determines the pixel sequence range, which is to undergo pixel replacement, based on at least one of the fluctuation count and the fluctuation amount, wherein said range determination unit comprises a second comparison unit constructed to compare the fluctuation count with a third threshold and a fourth threshold larger than the third threshold, sets the pixel sequence range to be a designated minimum range when the fluctuation count is smaller than the third threshold, sets the pixel sequence range to a designated maximum range when the fluctuation count is larger than the fourth threshold, and sets the pixel sequence range by linear interpolation using the maximum range and the minimum range when the fluctuation count is larger than the third threshold and is smaller than the fourth threshold.

3. An image processing method for processing image data, comprising:

a region setting step of setting a region configured by a plurality of pixels including a pixel of interest;

a brightness value derivation step of deriving brightness values of the pixels in the region;

a first derivative derivation step of deriving first derivatives of the brightness values derived in the brightness value derivation step for a plurality of pixel sequences in different directions, which include the pixel of interest;

an edge direction determination step of determining an edge direction of brightness at a position of the pixel of interest based on the results of the first derivatives at positions of the pixel of interest in the respective pixel sequences derived in the first derivative derivation step;

a range determination step of determining a pixel sequence range, which is to undergo pixel value replacement, based on the first derivatives at respective positions of a plurality of pixels which line up in the edge direction determined in the edge direction determination step; and a replacement step of calculating second derivatives of brightness values along a lineup direction of the pixels in the pixel sequence range, replacing a pixel value of the pixel of interest by a pixel value of a pixel which has a minimum brightness value in the pixel sequence range when the second derivative at the position of the pixel of interest assumes a positive value, and replacing a pixel value of the pixel of interest by a pixel value of a pixel which has a maximum brightness value in the pixel sequence range when the second derivative at the position of the pixel of interest assumes a negative value, wherein said range determination step comprises:

a fluctuation count derivation step of deriving a fluctuation count of brightness values based on the first derivatives at the respective positions of the plurality of pixels which line up in the edge direction; and a fluctuation amount derivation step of deriving a fluctuation amount of brightness values based on the first derivatives at the respective positions of the plurality of pixels which line up in the edge direction, and said range determination step determines the pixel sequence range, which is to undergo pixel replacement, based on at least one of the fluctuation count and the fluctuation amount, wherein said range determination step comprises a first comparison step of comparing the fluctuation count with a first threshold and a second threshold larger than the first threshold, setting the pixel sequence range to be a designated maximum range when the fluctuation count is smaller than the first threshold, setting the pixel sequence range to a designated minimum range when the fluctuation count is larger than the second threshold, and setting the pixel sequence range by linear interpolation using the maximum range and the minimum range when the fluctuation count is larger than the first threshold and is smaller than the second threshold.

4. A non-transitory computer-readable storage medium storing a computer-executable image processing program, the computer-executable image processing program comprising:

a program code for implementing a region setting step of setting a region configured by a plurality of pixels including a pixel of interest;

a program code for implementing a brightness value derivation step of deriving brightness values of the pixels in the region;

a program code for implementing a first derivative derivation step of deriving first derivatives of the brightness values derived in the brightness value derivation step for a plurality of pixel sequences in different directions, which include the pixel of interest;

a program code for implementing an edge direction determination step of determining an edge direction of brightness at a position of the pixel of interest based on the results of the first derivatives at positions of the pixel of interest in the respective pixel sequences derived in the first derivative derivation step;

a program code for implementing a range determination step of determining a pixel sequence range, which is to undergo pixel value replacement, based on the first derivatives at respective positions of a plurality of pixels which line up in the edge direction determined in the edge direction determination step; and a program code for implementing a replacement step of calculating second derivatives of brightness values along a lineup direction of the pixels in the pixel sequence range, replacing a pixel value of the pixel of interest by a pixel value of a pixel which has a minimum brightness value in the pixel sequence range when the second derivative at the position of the pixel of interest assumes a positive value, and replacing a pixel value of the pixel of interest by a pixel value of a pixel which has a maximum brightness value in the pixel sequence range when the second derivative at the position of the pixel of interest assumes a negative value, wherein said range determination step comprises a fluctuation count derivation step of deriving a fluctuation count of brightness values based on the first derivatives at the respective positions of the plurality of pixels which line up in the edge direction; and a fluctuation amount derivation step of deriving a fluctuation amount of brightness values based on the first derivatives at the respective positions of the plurality of pixels which line up in the edge direction, and said range determination step determines the pixel sequence range, which is to undergo pixel replacement, based on at least one of the fluctuation count and the fluctuation amount, wherein said range determination step includes a first comparison step of comparing the fluctuation count with a first threshold and a second threshold larger than the first threshold, setting the pixel sequence range to be a designated maximum range when the fluctuation count is smaller than the first threshold, setting the pixel sequence range to a designated minimum range when the fluctuation count is larger than the second threshold, and setting the pixel sequence range by linear interpolation using the maximum range and the minimum range when the fluctuation count is larger than the first threshold and is smaller than the second threshold.

5. An image processing method for processing image data, comprising:

a region setting step of setting a region configured by a plurality of pixels including a pixel of interest;

a brightness value derivation step of deriving brightness values of the pixels in the region;

a first derivative derivation step of deriving first derivatives of the brightness values derived by said brightness value derivation step for a plurality of pixel sequences in different directions, which include the pixel of interest;

an edge direction determination step of determining an edge direction of brightness at a position of the pixel of interest based on the results of the first derivatives at positions of the pixel of interest in the respective pixel sequences derived by said first derivative derivation step;

a range determination step of determining a pixel sequence range, which is to undergo pixel value replacement, based on the first derivatives at respective positions of a plurality of pixels which line up in the edge direction determined by said edge direction determination step; and a replacement step of calculating second derivatives of brightness values along a lineup direction of the pixels in the pixel sequence range, to replace a pixel value of the pixel of interest by a pixel value of a pixel which has a minimum brightness value in the pixel sequence range when the second derivative at the position of the pixel of interest assumes a positive value, and to replace a pixel value of the pixel of interest by a pixel value of a pixel which has a maximum brightness value in the pixel sequence range when the second derivative at the position of the pixel of interest assumes a negative value, wherein said range determination step comprises:

a fluctuation count derivation step of deriving a fluctuation count of brightness values based on the first derivatives at the respective positions of the plurality of pixels which line up in the edge direction; and a fluctuation amount derivation step of deriving a fluctuation amount of brightness values based on the first derivatives at the respective positions of the plurality of pixels which line up in the edge direction, and said range determination step determines the pixel sequence range, which is to undergo pixel replacement, based on at least one of the fluctuation count and the fluctuation amount, wherein said range determination step comprises a second comparison step of comparing the fluctuation count with a third threshold and a fourth threshold larger than the third threshold, sets the pixel sequence range to be a designated minimum range when the fluctuation count is smaller than the third threshold, sets the pixel sequence range to a designated maximum range when the fluctuation count is larger than the fourth threshold, and sets the pixel sequence range by linear interpolation using the maximum range and the minimum range when the fluctuation count is larger than the third threshold and is smaller than the fourth threshold.

6. A non-transitory computer-readable storage medium storing a computer-executable image processing program, the computer-executable image processing program comprising:

a program code for implementing a region setting step of setting a region configured by a plurality of pixels including a pixel of interest;

a program code for implementing a brightness value derivation step of deriving brightness values of the pixels in the region;

a program code for implementing a first derivative derivation step of deriving first derivatives of the brightness values derived by said brightness value derivation step for a plurality of pixel sequences in different directions, which include the pixel of interest;

a program code for implementing an edge direction determination step of determining an edge direction of brightness at a position of the pixel of interest based on the results of the first derivatives at positions of the pixel of interest in the respective pixel sequences derived by said first derivative derivation step;

a program code for implementing a range determination step of determining a pixel sequence range, which is to undergo pixel value replacement, based on the first derivatives at respective positions of a plurality of pixels which line up in the edge direction determined by said edge direction determination step; and a program code for implementing a replacement step of calculating second derivatives of brightness values along a lineup direction of the pixels in the pixel sequence range, to replace a pixel value of the pixel of interest by a pixel value of a pixel which has a minimum brightness value in the pixel sequence range when the second derivative at the position of the pixel of interest assumes a positive value, and to replace a pixel value of the pixel of interest by a pixel value of a pixel which has a maximum brightness value in the pixel sequence range when the second derivative at the position of the pixel of interest assumes a negative value, wherein said range determination step comprises:

a fluctuation count derivation step of deriving a fluctuation count of brightness values based on the first derivatives at the respective positions of the plurality of pixels which line up in the edge direction; and a fluctuation amount derivation step of deriving a fluctuation amount of brightness values based on the first derivatives at the respective positions of the plurality of pixels which line up in the edge direction, and said range determination step determines the pixel sequence range, which is to undergo pixel replacement, based on at least one of the fluctuation count and the fluctuation amount, wherein said range determination step comprises a second comparison step of comparing the fluctuation count with a third threshold and a fourth threshold larger than the third threshold, sets the pixel sequence range to be a designated minimum range when the fluctuation count is smaller than the third threshold, sets the pixel sequence range to a designated maximum range when the fluctuation count is larger than the fourth threshold, and sets the pixel sequence range by linear interpolation using the maximum range and the minimum range when the fluctuation count is larger than the third threshold and is smaller than the fourth threshold.

* * * * *